US012801123B2

(12) United States Patent
Yung et al.

(10) Patent No.: US 12,801,123 B2
(45) Date of Patent: Nov. 17, 2026

(54) CERTIFICATION FRAMEWORK FOR STEM INDUSTRIAL PRODUCTS

(71) Applicants: THE HONG KONG POLYTECHNIC UNIVERSITY, Hong Kong (CN); Federation of Hong Kong Industries, Hong Kong (CN)

(72) Inventors: Kam Chuen Yung, Hong Kong (CN); Ngai Chiu Sunny Chai, Hong Kong (CN); Kin Wai Shum, Hong Kong (CN); Hang Shan Choy, Hong Kong (CN); Huizhe Rao, Hong Kong (CN); Ying-Ying Leung, Hong Kong (CN)

(73) Assignees: The Hong Kong Polytechnic University, Hong Kong (CN); Federation of Hong Kong Industries, Hong Kong (CN)

( * ) Notice: Subject to any disclaimer, the term of this patent is extended or adjusted under 35 U.S.C. 154(b) by 288 days.

(21) Appl. No.: 18/668,610

(22) Filed: May 20, 2024

(65) Prior Publication Data

US 2024/0402685 A1 Dec. 5, 2024

(51) Int. Cl.
*G05B 19/418* (2006.01)

(52) U.S. Cl.
CPC ... *G05B 19/4184* (2013.01); *G05B 19/41845* (2013.01)

(58) Field of Classification Search
CPC ............. G06Q 10/0639; G06Q 50/205; G06Q 10/06375; G06Q 10/06398; G06Q 30/018; G06Q 30/0282; G06Q 50/20; G06Q 10/06; G06Q 10/063; G06Q 10/0637; G06F 11/3409; G06F 16/24578; G06F 11/0709; G06F 11/0715; G06F 11/3003;

(Continued)

(56) References Cited

U.S. PATENT DOCUMENTS 7,251,752 B2 * 7/2007 Adams ................ G06F 11/3636
714/38.14
7,587,324 B2 * 9/2009 Kaiser ................ G06Q 30/0201
705/7.29

(Continued)

OTHER PUBLICATIONS

Formation and Assessment of a Tool to Evaluate STEM Literacy in Service-Learning Projects Formation and Assessment of a Tool to Evaluate STEM Literacy in Service-Learning Projects (Year: 2015).*

(Continued)

*Primary Examiner* — Darrin D Dunn
(74) *Attorney, Agent, or Firm* — S&F/WEHRW

(57) ABSTRACT

A method for certifying a Science, Technology, Engineering and Mathematics (STEM) industrial product is provided. Exemplarily, the method comprises: evaluating and scoring (831) a STEM literacy level acquirable by using the product to thereby yield a first score for STEM literacy; evaluating and scoring (832) product features findable in the product to thereby yield a second score for product features; evaluating and scoring (833) general abilities learnable after using the product to thereby yield a third score for general abilities; making (842) a final decision on a total score for the product according to the first, second and third scores; and awarding (843) the product with a certification level according to the total score of the product.

11 Claims, 14 Drawing Sheets

(58) Field of Classification Search
CPC .... G06F 11/3013; G06F 11/302; G06F 11/34; G06F 11/3466; G06F 11/3476; G06F 11/3495
See application file for complete search history.

(56) References Cited

U.S. PATENT DOCUMENTS

| | | | | |
|---|---|---|---|---|
| 9,355,006 | B2 * | 5/2016 | Vlachogiannis | G06F 11/34 |
| 11,551,787 | B2 * | 1/2023 | Barreto | G06F 16/9535 |
| 2005/0060221 | A1 * | 3/2005 | Kolar | G06Q 10/0637 705/7.29 |
| 2006/0078868 | A1 * | 4/2006 | Douglas | G09B 7/00 434/365 |
| 2009/0061403 | A1 * | 3/2009 | Price | G09B 19/00 705/326 |
| 2009/0106236 | A1 * | 4/2009 | Koefoot | G06Q 30/02 707/999.005 |
| 2009/0119023 | A1 * | 5/2009 | Zimmer | G06Q 30/00 702/22 |
| 2009/0327053 | A1 * | 12/2009 | Niblock | G06Q 50/20 434/118 |
| 2010/0249975 | A1 * | 9/2010 | Rezayat | G06Q 10/06 700/106 |
| 2016/0358486 | A1 * | 12/2016 | Bilic | G09B 5/00 |
| 2018/0182256 | A1 * | 6/2018 | Gotgart | G09B 7/02 |
| 2020/0051460 | A1 * | 2/2020 | Bedor | G09B 19/22 |
| 2020/0371034 | A1 * | 11/2020 | Rothberg | B01L 3/5085 |
| 2022/0114205 | A1 * | 4/2022 | Rodrigues | G06F 16/438 |
| 2022/0343256 | A1 * | 10/2022 | Mallar | G06Q 50/205 |
| 2023/0089850 | A1 * | 3/2023 | Zhu | G06Q 30/018 705/7.29 |
| 2023/0410017 | A1 * | 12/2023 | Dwivedi | G06Q 50/08 |
| 2025/0363430 | A1 * | 11/2025 | Ganesh | G06F 16/367 |

OTHER PUBLICATIONS

International Search Report and Written Opinion of PCT application No. PCT/CN2024/094163 issued from the International Search Authority on May 20, 2024.

China Toy & Juvenile Products Association. "Specification assessment for STEAM toys" https://www.wjyt-china.org/biaozhun/104814.html, Sep. 28, 2021 (Sep. 28, 2021), p. 6, paragraph 1, to p. 8, paragraph 1.

* cited by examiner

| | ALESSI KETTLE | MURPHY RICHARDS KETTLE | NOVELTY ONE OFF KETTLE |
|---|---|---|---|
| | 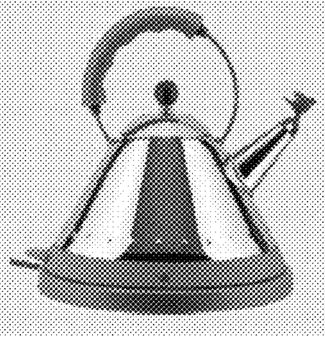 |  | 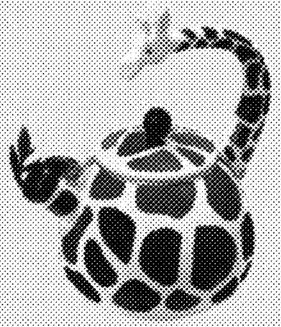 |
| Aesthetics | Metal Finish, Interesting | Vibrant Purple | Giraffe Pattern |
| Cost | £100 | £25 | £80 |
| Customer | Young Professionals, Designers | A Wide Range of People | Select Group, Artists |
| Environment | Disassembled and Recycled | Good Energy Efficiency | Poor Energy Efficiency |
| Size | One Size | One Size | One Size |
| Safety | Large Handle | Large Handle, Rounded Edges | Valve on Spout |
| Function | Holds / Boils Water | Holds / Boils Water | Holds / Boils Water |
| Materials | Stainless Steel, Plastic | Plastic | Plastic |

FIG. 10

(a) Score($X_1$) for STEM literacy
17 out of 20 (Full score).
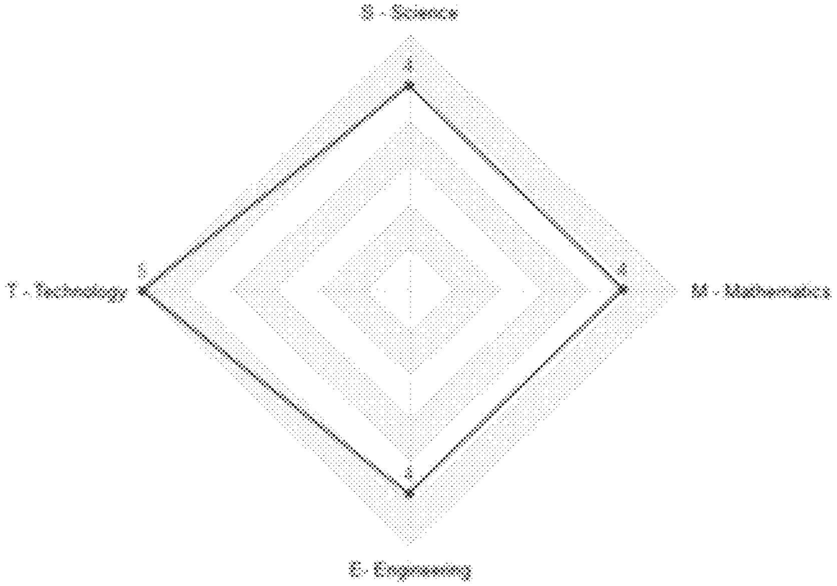
(b) Score ($X_2$) for the product features
56 out of 70 (Full score).
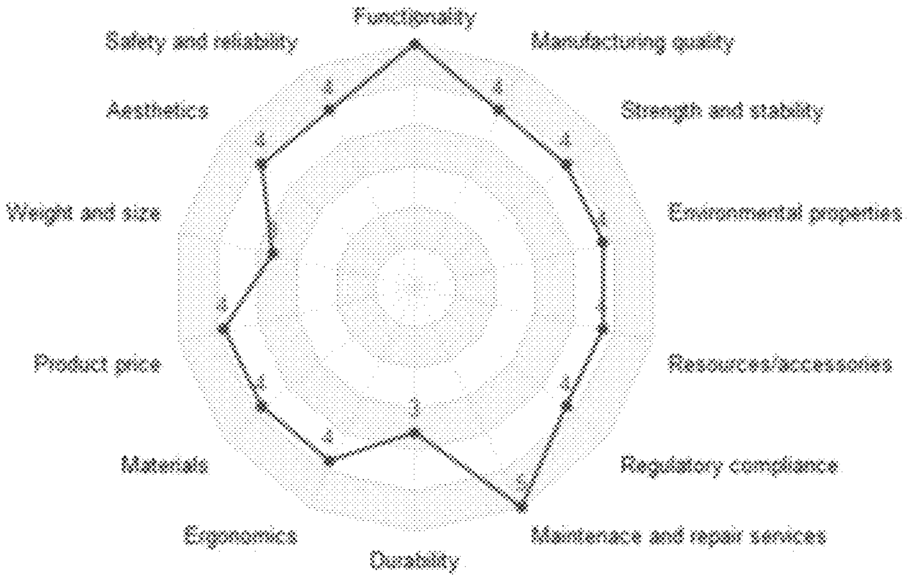
FIG. 15

(c) Score ($X_3$) for *the general abilities*
49 out of 65 (Full score).

CERTIFICATION FRAMEWORK FOR STEM INDUSTRIAL PRODUCTS

CROSS REFERENCE TO RELATED APPLICATIONS

This application claims priority to Hong Kong Short-Term Patent Application No. 320230732556 filed on May 22, 2023, the disclosure of which is incorporated by reference herein in its entirety.

FIELD OF THE INVENTION

The present invention relates to a framework for certifying STEM industrial products related to Science, Technology, Engineering, and Mathematics (STEM).

BACKGROUND 1.1. Background in STEM Education and the Generic and Specific Definitions of STEM Industrial Products STEM stands for science, technology, engineering and mathematics. STEM industrial products are products based on science, technology, engineering and mathematics, which can help students deepen their understanding of STEM knowledge in practical applications. With the development of STEM education, STEM industrial products have become more and more diversified. However, many school teachers lack industrial practical experience and cannot effectively judge industrial products. This is a huge obstacle to the use of STEM industrial products. In order to solve this problem, a certification framework for STEM industrial products is developed, in which we apply statistical classification algorithms to analyze the collected data of STEM industrial products according to product characteristics in order to more effectively develop the certification framework. This can help consumers more accurately identify STEM industrial products. In this section, the basic definitions of STEM education and industrial products are comprehensively reviewed and the components in STEM industrial products are discussed. The design, production and evaluation of training modules and functions of STEM industrial products are also proposed.

1.1.1. STEM Education (A) Generic and Specific Definition of STEM

For the specific definition, STEM is a combination of four subjects' abbreviations: Science, Technology, Engineering, and Mathematics. According to [1], the attributes of the four subjects in STEM can be generically defined as follows.

Science(S): the systematic study of the nature and behavior of the material and physical universe, based on observation, experiment, and measurement, and the formulation of laws to describe these facts in general terms.

Technology (T): the branch of knowledge that deals with the creation and use of technical means and their interrelation with life, society, and the environment, drawing upon such subjects as industrial arts, engineering, applied science, and pure science.

Engineering (E): the art or science of making practical application of the knowledge of pure sciences, such as physics or chemistry, as, for example, in the construction of engines, bridges, buildings, mines, ships, and chemical plants.

Mathematics (M): a group of related sciences, including algebra, geometry, and calculus, concerned with the study of number, quantity, shape, and space and their interrelationships by using specialized notation.

(B) Definition of STEM Education

STEM education is the intentional integration of the above mentioned subjects and their associated practices [2]. A student-centered learning environment is created under STEM education approaches [3], advancing the learning practices of engineering solutions problem-solving, investigation, and the construct evidence-based explanation of various real-world phenomena, with the sharing corporation of educational institutes, families, and community partners (e.g., Education Bureau, STEM industrial products manufacturers).

(C) STEM Education and Student Careers

STEM education prepares students for the future workforce. STEM education is positioned to develop thinking that is reconceptualized as plural and should be able to differentiate at multiple models of levels, which is an important aspect of competencies for the workforce in the future [3]. Manosuttirit [4] stated that students who have access to quality STEM learning, are able to think deeply and to think well, which are the most critical criteria to become educators, innovators, leaders, and researchers, who solve the most pressing national challenges and even the world. STEM education is specially designed to support students to pursue research and innovation in their career paths (e.g., physical science research and engineering [5]), as well as their formative education. Such education approach increases the interest of students in further studying the component disciplines of STEM, and STEM-related careers [6], hence helping to prepare our future generations to tackle our world's biggest problems (e.g., environment pollution, global health). Therefore, STEM education is critical for students' career development.

(D) STEM Education and Country Development

STEM education is important for 21-century national development. Scientific and technological innovations have become increasingly crucial in the 21-century [7]. Globalization and a knowledge-based economy bring benefits and challenges to a country's development at the same time. To better adapt to the highly technological and new information-based society, a better workforce with capabilities in STEM is preferred and demanded in a country's development [8]. The long-term potential productivity of an economy is shaped by the legal and economic framework [9], and one of the significant factors improving the framework is the efficiency of the educational system [9]. A quality STEM education advocates plural thinking (differentiates thinking into multiple models with levels) and a problem-solving approach [3], which improves the efficiency of the education. Barcelona suggested that innovation leads to the processes that ensure the sustainability of the economy, and it also depends on a solid base in the integrated STEM development. Thus, quality STEM education is beneficial to the economic development of an economy.

1.1.2. Industrial products (A) Generic and Specific Definition of Industrial Products Industrial products are specifically called intermediate goods or producer goods [11]. Industrial products can also be generically defined as a generalized term for any man-made, durable goods purchased by businesses or producers [13], as an input in a manufacturing process, and it does not have any independent status [14]. Industrial products are input elements needed for rendering services or producing other goods, including final goods [15], that are sold to, or supplied for, other person or organizations [16]. Final goods, which are also known as consumer goods, are the end products of business production and are purchased by consumers that can be directly used to satisfy human needs [16, 17].

(B) Industrial Product Examples

Although industrial products and final goods are contrasting, many products can be described by both terms. Therefore, to define whether a product is an industrial product, its intended usage must be considered.

A Power station and oil-drilling equipment are industrial products as they are used to produce electricity and oil for consumption respectively [15]. Products like cars could be both final goods or industrial products [15]. If cars are used for final goods transportation, they are identified as industrial products, private transportation, and final goods.

1.1.3. STEM Industrial Products

Before defining STEM industrial products, some STEM products should be defined first since these STEM products may not be produced through industrial process.

Definition of a STEM product: A STEM product is a product that helps users apply knowledge and skills from the disciplines of science, technology, engineering, and mathematics to design, use, develop, and innovate.

These products are often designed to solve real-world problems and are used in many areas such as systems engineering, the medical industry, agriculture, the military, and more.

(A) Generic and Specific Definition of STEM Industrial Products

Industrial products are products that are purchased and used for processing or business operations. The difference between consumer goods and industrial goods lies in their purchase purpose. There are many ways to classify industrial products, one of which is based on the perspective of the producer and the way in which the product is purchased, and the other is based on the perspective of the manufacturer, production methods and costs. The latter classification standard is more widely used in industry. STEM industrial products can be defined specifically by referring to industrial products that can apply science, technology, engineering, and mathematics related knowledge to promote related education, such as cultivating modern electronic processing capabilities, scientific and technological development capabilities, and socialized problem-solving capabilities, etc.

STEM industrial products cannot be derived from a sophisticated STEM education system [19]. In a generic definition, STEM industrial products are man-made, durable non-final goods [12], as input elements in a manufacturing process, that have educational value in the subject combinations of Science, Technology, Engineering, or Mathematics.

(A.1) Specific Definition of STEM Industrial Products:

STEM industrial products can be specifically defined to refer to STEM industrial products designed to teach science, technology, engineering, and mathematics for STEM-related educational purposes, such as modern electronic computing skills, science and technology development skills, digital and data literacy, etc., in a way that they are accessible to students of all ages and abilities, taking into account the characteristics of the product, and developing general skills such as curiosity, critical thinking, problem-solving, etc.

Common STEM-specific industrial products include educational toys and games that support the learning process, advanced robotics, coding kits, 3D printers, construction kits and virtual reality headsets, technology-based tools, drones, smart planters, and more.

(A.2) Generic Definition of STEM Industrial Products:

In a generic definition, STEM industrial products are products manufactured by industrial processes using raw materials and components and they have educational value in a combination of science, technology, engineering, or mathematics subjects. STEM industrial products cannot be derived from the sophisticated STEM education system. It may also refer to specific industry sectors and specific products such as solar cars, educational toys, games websites, educational software, video games, puzzles, and project kits.

Examples of applications for STEM industrial products include computers and electronics, architecture and engineering services, software development, healthcare products, physics, and life science products.

(B) Applications for STEM Industrial Products

In STEM education, STEM industrial products might be STEM-oriented toys or supplementary exercises. These industrial products provide students with a comprehensive practical experience, which is one of the main learning approaches in STEM education [20]. There are a few features that STEM industrial products should include: apply knowledge in STEM, problem-solving skills, stimulate plural thinking [21], and arouse interest in STEM education [22].

1.2. Establishing a Framework for the Certification of STEM Industrial Products

STEM education is essential for science and technology-based innovation which is the key reform strategy in education for many countries that seek to improve their technical workforce and economy. Besides STEM education, there is other similar education discipline called STEAM (Science, Technology, Engineering, Arts, Mathematics), which is more comprehensive than STEM, since STEAM consists both science and art related learning parts. However, as the art learning part is subjective, diverse and immeasurable, and customized according to the needs of users at a later stage, STEAM will not be discussed and analysed in this invention.

Instead, this work thus focuses more on the qualitative study for STEM development. Previous patent documents associated with STEM education and industrial products include US2007/0269773A1, US2007/0269773A1, U.S. Pat. No. 6,669,486 B2, U.S. Pat. No. 6,862,696B1, U.S. Pat. No. 6,934,028B2, U.S. Pat. No. 8,015,039B2, CN107453872A, US2014/0370487A1, U.S. Pat. No. 9,691,294B2, JP3027583U, US2008/0233550A1, U.S. Pat. No. 6,529,705B1 and WO2014/134633A2. Many of these studies showed the correlation between student learning and educational teaching aids including educational industrial products. Student's learning experience with STEM industrial products will improve learning efficiency. However, the current problem with using STEM industrial products is that many teachers lack of practical industrial engineering knowledge that limits their ability to provide effective STEM education to their students. And there is no common standard of STEM industrial products for the manufacturers to follow.

1.3. Two (2) Technical Challenges Involved in the Framework Development for the Certification of STEM Industrial Products STEM industrial products are different from industrial products. The certification framework for STEM industrial products should be developed differently from the existing certification framework of industrial products. The existence of the above problems will also directly affect the effect of students using STEM industrial products. The quality of STEM industrial products on the market is uneven. Manufacturers do not have a unified standard to develop STEM industrial products. At present, there is no unified standard certification framework to help teachers and other consumers identify more effective STEM industrial products. This work attempts to establish a certification development framework for STEM industrial products, so that consumers can find suitable and effective STEM industrial products among the many products in the market.

The problem of insufficient integration of Science, Technology, Engineering, and Mathematics is also reflected in STEM industrial products. Many STEM industrial products are not able to balance STEM well, which makes the products incomplete and fails to allow students to improve their comprehensive application capabilities. In the process of promoting and popularizing STEM education, some challenges have gradually emerged. The following two challenges have also affected the framework development for the certification of STEM industrial products.

1.3.1. First Challenge in the Framework Development

The first challenge involves actively including technology and engineering in the program. STEM has been struggling with its identity since its inception and the most pressing challenge for STEM education is in recognizing the actual meaning of STEM. This identity problem can be seen from the misunderstanding that STEM concerns emphasizing a particular subject and the exclusion of others, which is not the intention. The purpose of STEM is to use the effectiveness of these critical subjects for integration into actual industrial applications.

Scientists study the question 'WHY' for scientific discoveries but engineers focus on 'HOW' to use scientific discoveries and design them into a product (technology). Therefore, technology and engineering subjects should not be treated as just additional subjects but as integrated subjects because technologies are the product of engineering design activity. Most current STEM strategies do not meet the requirements of design, iteration, and creation as part of their program. STEM program design should provide intentional support for students to build knowledge and skills across and within disciplines, but this is often missing currently [23].

Engineers need to use science and mathematics for the study of engineering but the same cannot be applied for scientists and mathematicians because there are no engineering requirements for the study of science and mathematics. This analogy could be used to explain the reason for academic teachers not having the experience and understanding of the means and methods used in industry. Therefore, a better partnership with industry is required to shift from a content-based to a skills-based paradigm [24].

Strimel et al. [25], proposed three pathways for engineering education. The first is to continue with the current method of teaching technology and engineering. Secondly, collaboration between the engineering and science educated professions is required to find the distinctions and differences between both fields. The third and most viable pathway is to establish engineering education with input from the engineering community in regard to engineering content and practice.

The problem of insufficient integration of Science, Technology, Engineering, and Mathematics is also reflected in STEM industrial products. Many STEM industrial products cannot balance STEM well, which makes the products incomplete and fail to allow students to improve their comprehensive application capabilities.

1.3.2. Second Challenge in the Framework Development

A STEM education program should include the application of knowledge to actual STEM related applications. In general, STEM education is usually more focused on science or mathematics, and seldom refers to technology and engineering. This must be remedied for STEM education to have a positive influence on students, because engineering and technology can be difficult to grasp for academically minded teachers who have no industrial experience. Teachers are usually better at content knowledge, but lack the application of technology in actual situations. The biggest challenge in providing effective STEM education programs is the lack of engineering skills of the teachers in relating it with their students [23]. Teachers cannot lead students to use STEM industrial products satisfactorily, nor can they identify which STEM industrial products can help students more effectively.

SUMMARY OF THE INVENTION

Mathematical equations referenced in this Summary can be found in Detailed Description.

The present invention is concerned with establishing a STEM industrial product certification framework, which can be used by industry sectors (e.g., product manufacturers and suppliers) and consumers (e.g., educators, parents, and students) to identify and categorize STEM industrial products.

An aspect of the present invention is to provide a method for certifying a STEM industrial product.

The method comprises: evaluating and scoring a STEM literacy level acquirable by using the product to thereby yield a first score for STEM literacy; evaluating and scoring product features findable in the product to thereby yield a second score for product features; evaluating and scoring general abilities learnable after using the product to thereby yield a third score for general abilities; making a final decision on a total score for the product according to the first, second and third scores; and awarding the product with a certification level according to the total score of the product.

If the product is hardware only, preferably the evaluating and scoring of the product features includes respectively evaluating the product under review categories of: ergonomics; aesthetics; functionality; safety and reliability; product price; weight and size; materials; durability; manufacturing quality; strength and stability; environmental properties; resources or accessories; regulatory compliance; and maintenance and repair services; whereby the second score is obtained.

If the product is software only, preferably the evaluating and scoring of the product features includes respectively evaluating the product under review categories of: usability; reliability; compatibility; portability; testability; scalability; flexibility; functional suitability; maintainability and repair services; interoperability; performance efficiency; product price; and security; whereby the second score is obtained.

If the product has a hardware component and a software component, preferably the evaluating and scoring of the product features includes: (a) respectively evaluating the hardware component under review categories of: ergonomics; aesthetics; functionality; safety and reliability; product price; weight and size; materials; durability; manufacturing quality; strength and stability; environmental properties; resources or accessories; regulatory compliance; and maintenance and repair services; whereby a fourth score for product features related to the hardware component is obtained; (b) respectively evaluating the software component under review categories of: usability; reliability; compatibility; portability; testability; scalability; flexibility; functional suitability; maintainability and repair services; interoperability; performance efficiency; product price; and security; whereby a fifth score for product features related to the software component is obtained; and (c) obtaining the second score by averaging the fourth and fifth scores.

Preferably, the general abilities include: critical thinking; communication; creativity; collaboration; problem-solving; data literacy; digital literacy; initiative; curiosity; persistence; adaptability; leadership; and social and cultural awareness.

In certain embodiments, the total score for the product is computed as a weighted average of the first, second and third scores.

Respective weighting factors of the first, second and third scores may be unity in computing the total score.

In certain embodiments, the making of the final decision on the total score includes: normalizing the first, second and third scores to yield normalized scores of STEM literacy, of product features and of general abilities, respectively; and computing the total score by averaging the normalized scores of STEM literacy, of product features and of general abilities.

In certain embodiments, the normalized scores of STEM literacy, of product features and of general abilities are computed by EQN. (1) and the total score is computed by EQN. (2).

In certain embodiments, the awarding of the product with the certification level according to the total score of the product includes: determining that the certification level is 5 when $77\% \le Y \le 100\%$ for describing that the product achieves an excellent level in quality, where Y is the total score in percentage; determining that the certification level is 4 when $60\% \le Y < 77\%$ for describing that the product achieves a good level in quality; determining that the certification level is 3 when $50\% \le Y < 60\%$ for describing that the product achieves an average level in quality; determining that the certification level is 2 when $40\% \le Y < 50\%$ for describing that the product achieves a basic level in quality; and determining that the certification level is 1 when $0\% \le Y < 40\%$ for describing that the product achieves a poor, unsatisfactory level in quality.

Other aspects of the present invention are disclosed as illustrated by the embodiments hereinafter.

BRIEF DESCRIPTION OF THE DRAWINGS

FIG. 10 depicts three different kettles and their product features analysis (source: https://www.tes.com/teaching-resource/product-analysis-cards-11647721).

Skilled artisans will appreciate that elements in the figures are illustrated for simplicity and clarity and have not necessarily been depicted to scale.

DETAILED DESCRIPTION

Figure 1:
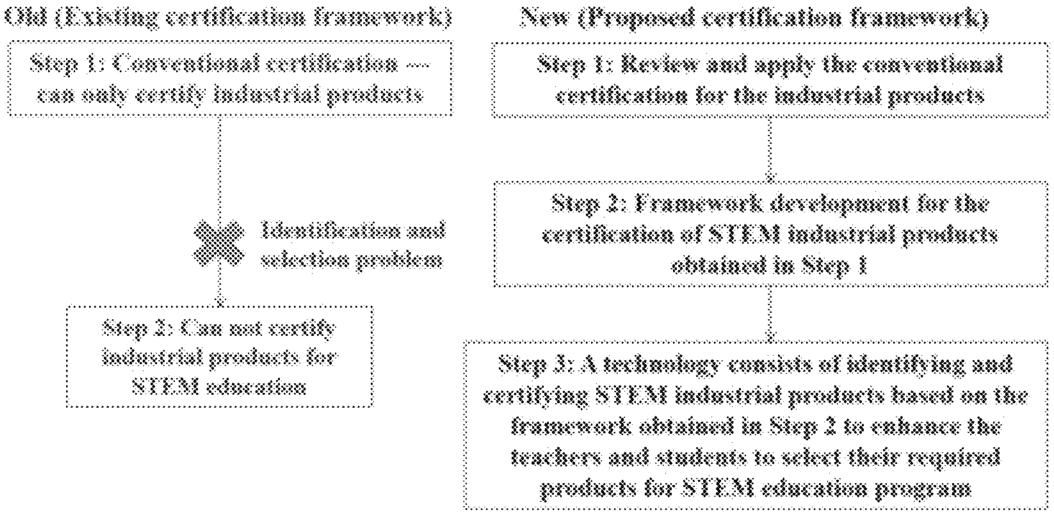
FIG. 1 depicts two flowcharts showing workflow for comparison, one based on conventional technology, another one based on our proposed technology.
Figure 2:
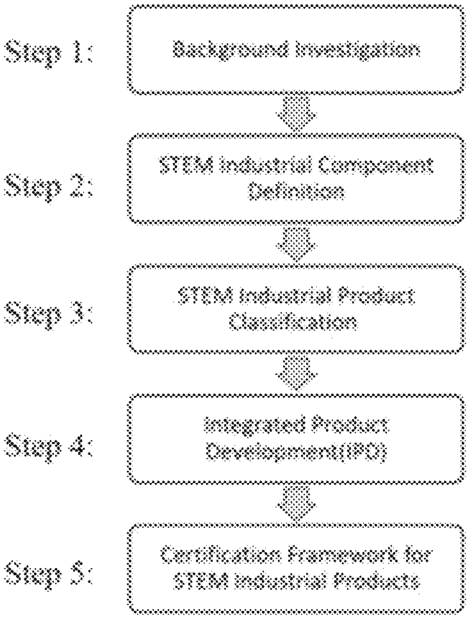
FIG. 2 depicts a workflow of the proposed technology in accordance with certain embodiments of the present invention.

2. Proposed Solutions to Address the Above Two Challenges:

FIG. 1 shows the flowcharts of the conventional technology and of the proposed technology. FIG. 2 exemplarily illustrates the workflow of the proposed technology. The proposed work in this project is summarized as follows:

The research methodology (FIG. 2) includes the following 5 steps.

- Step 1. Background Investigation: Review on the generic and specific definitions of STEM industrial products and related matters.
- Step 2. STEM Industrial Component Definition: Comprehensive study on individual STEM components for STEM industrial products (S=Science, e.g., sensors; T=Technology, e.g., Basic AI; E=Engineering, e.g., Electronic/Electrical/Mechanical/Industrial processes; M=Maths, e.g., Data clustering & Analytics).
- Step 3. STEM Industrial Product Classification: Defining the generic building and functional blocks in STEM industrial products and classifying STEM industrial products by function.
- Step 4. Integrated Product Development (IPD): Integrated product development of STEM industrial products.
- Step 5. Certification Framework for STEM Industrial Products: Development of the certification framework and process for STEM industrial products.

The above steps 1, 2 and 3 address challenge (i) in Section 1.3.1 and the above steps 4 and 5 address challenge (ii) in Section 1.3.2.

Figure 3:
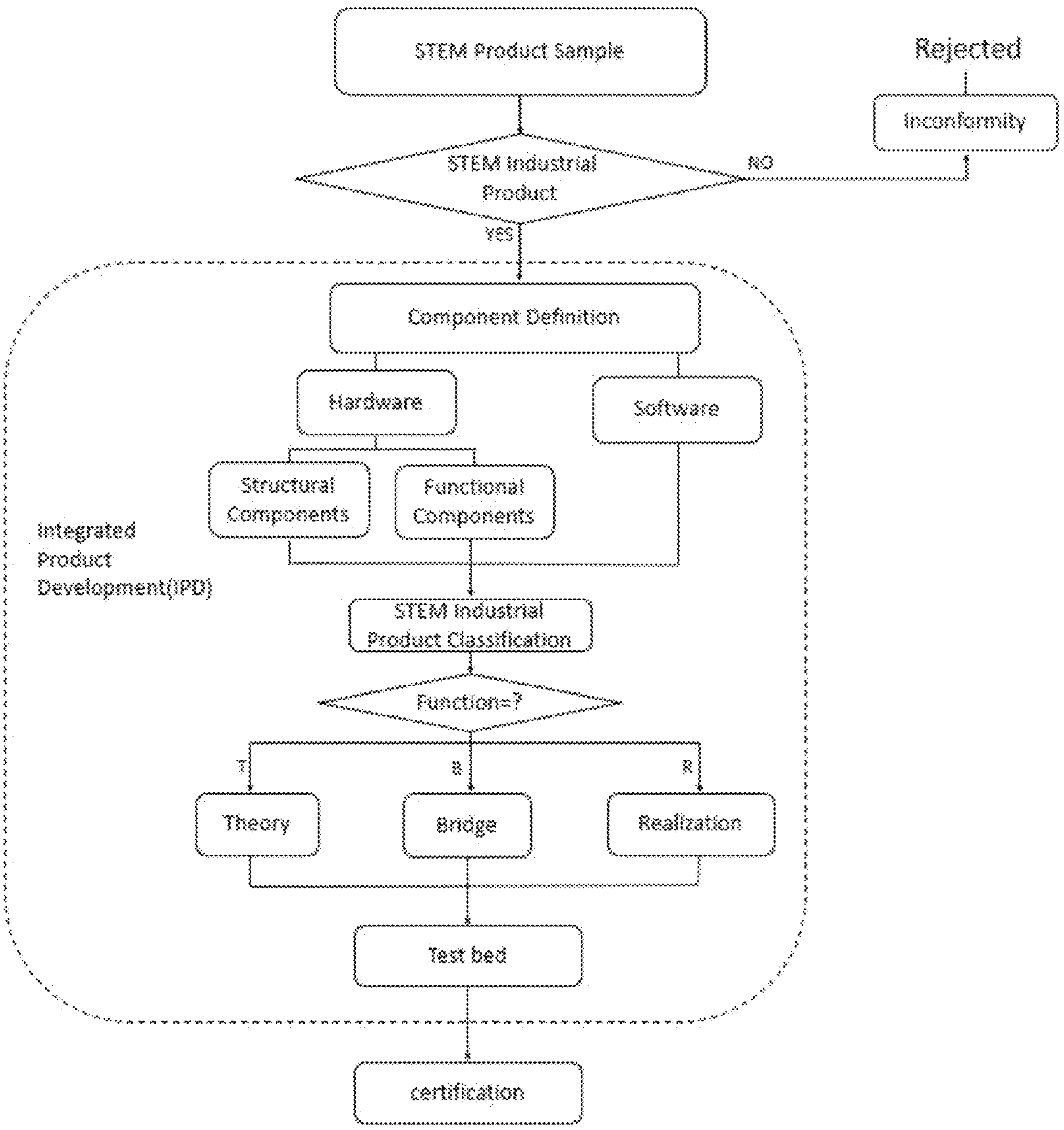
FIG. 3 depicts a proposed framework for the certification of STEM industrial products in accordance with certain embodiments of the present invention.

The proposed framework (FIG. 3) allows for the certification of STEM industrial products to help consumers identify industrial products with STEM elements, and also provides product manufacturers with a means to certify their products for STEM education.

As such, a systematic and detailed investigation of the framework development for the certification of STEM industrial products is needed.

In this invention, we have undertaken a study on the framework development for the certification of STEM industrial products, Step 3 (STEM Industrial Product Classification) through design, making and assessment (DMA), Step 4 (Integrated Product Development) and Step 5 (Certification Framework for STEM Industrial Products) are considered to be important for facilitating our preliminary evaluation of the basic training blocks, features, certification framework and process for STEM industrial products.

This section illustrates the proposed framework development for the certification of STEM industrial products.

2.1. Development of Design, Making and Assessment (DMA), for Identifying the Training Blocks and Features of STEM Industrial Products The development of training blocks and features for STEM industrial products requires background investigation, comprehensive study and defining/classifying the building blocks of STEM industrial products, as described in sections 2.1.1, 2.1.2, and 2.1.3 respectively. Many STEM industrial products can be considered to be of modular architecture that follows the process of Design, Making and Assessment. The STEM domain with features that fit into particular training blocks in the Design, Making and Assessment process has been identified for the evaluation of STEM industrial product development. By definition, a design is the act of working out the form of something (such as by making a sketch or outline or plan); making of something is the act or process of producing or creating it. An assessment is a consideration and a judgment. Sections 2.1.1, 2.1.2, and 2.1.3 can be viewed as the work required in the review of Design, Making, Assessment process of the STEM industrial products respectively.

2.1.1. (Review of Design) Background Investigation:

Background investigation of STEM industrial products and related definitions The review examples for this section are described. In order to gain an in-depth understanding of the challenges on STEM industrial products, the first question that we need to address is the definition: What is the specific definition of a STEM industrial product? Extensive definitions of STEM education are available but not for STEM industrial products and tools. An extensive literature review, survey and conference were conducted to provide an in-depth understanding of STEM industrial products and the tools needed for the successful implementation.

The definitions and existing STEM education framework are reviewed and the relevancy in producing the framework for STEM industrial products is defined [26].

The literature review using the Reche et al. [27] approach is as follows:

i) Keyword selection such as Science, Technology, Engineering, Mathematics and STEM products. This includes relationships among the keywords.

ii) Selection of journals and high-quality articles relevant to the topic. After identifying suitable combinations of keywords, the search result is classified and subjected to analysis.

iii) Inclusion and exclusion criteria definition. These criteria are to verify the relationship between articles with the research topic. The inclusion criteria include keywords such as science, technology engineering, mathematics, product development, criteria and framework. The exclusion criteria include syllabus and education roadmaps.

iv) Selection of the most relevant articles on the theme is selected and the content is extensively analyzed.

2.1.2. (Review of Making) STEM Industrial Component Definition:

Study on individual STEM components for industrial STEM products (S=Science, e.g., sensors; T=Technology, e.g., Basic AI; E=Engineering, e.g., Electronic/Electrical/Mechanical/Industrial processes; M=Maths, e.g., Data clustering & Analytics) is made as follows.

Figure 4:
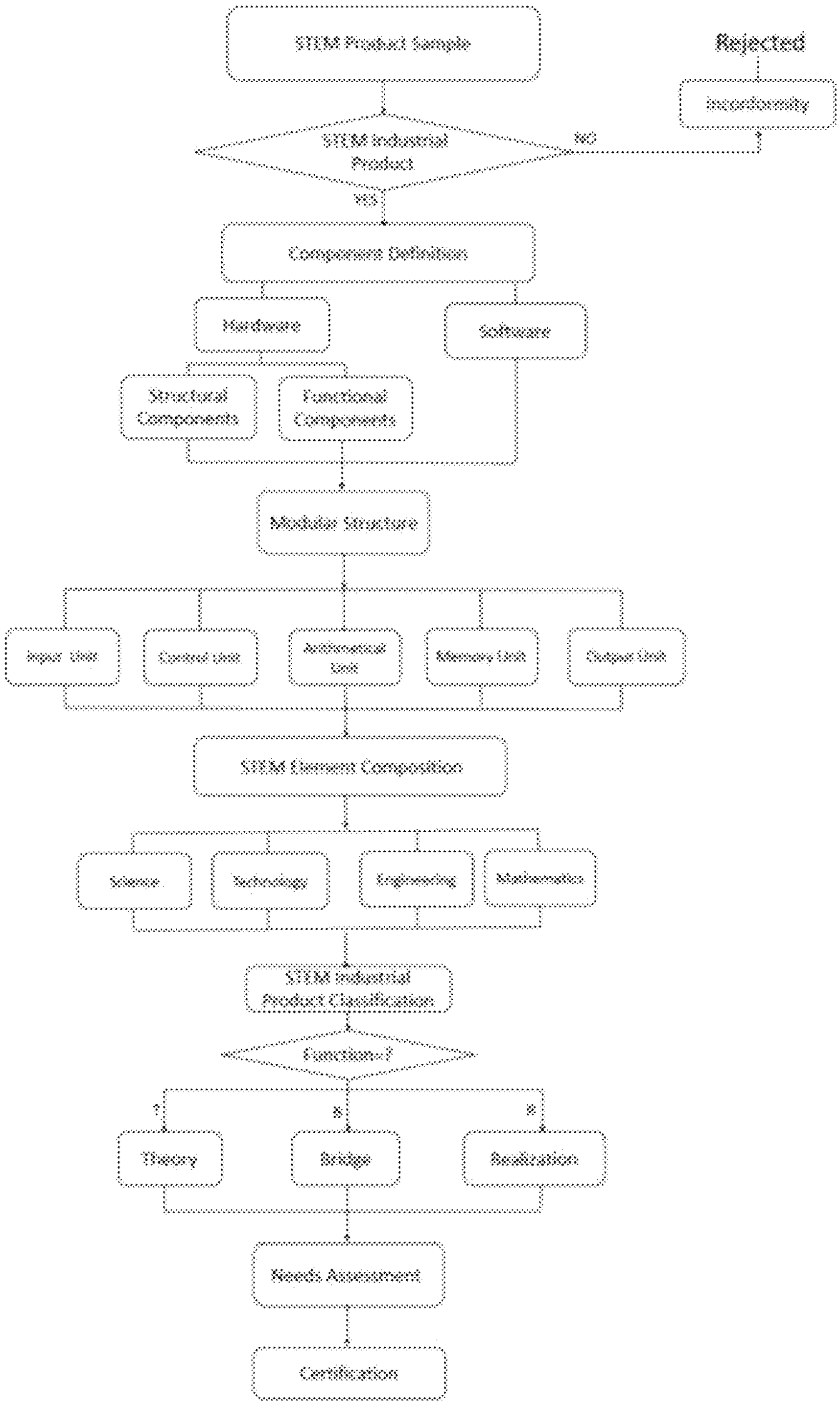
FIG. 4 depicts components for STEM industrial products and certification framework.
Figure 5:
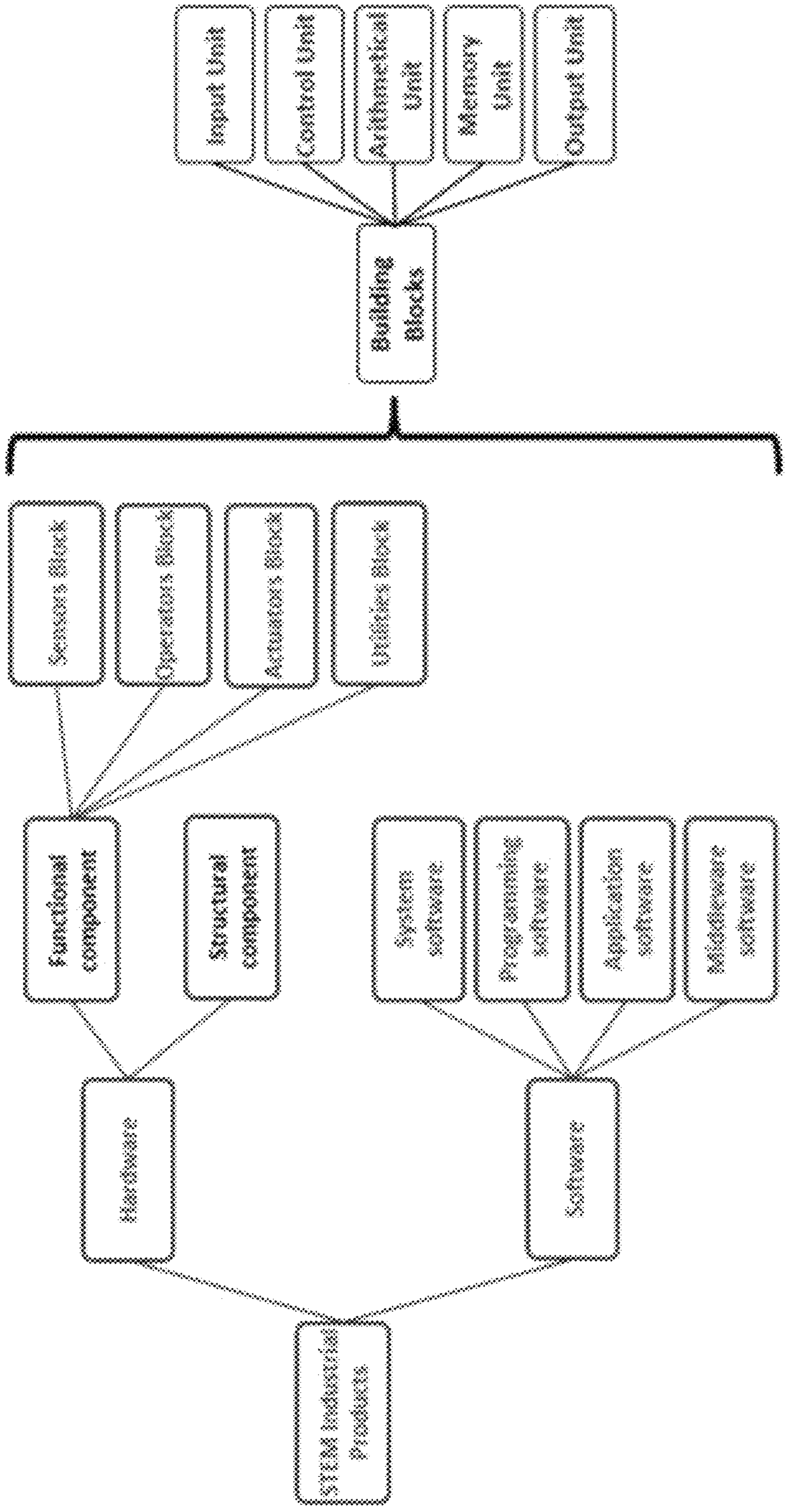
FIG. 5 depicts generic building blocks for the components of STEM industrial products.

A generic building block of STEM industrial products means a basic element or part that can regard as a unit together with many other things to form a whole STEM industrial product. All the building blocks are components for STEM industrial products. Generally speaking, the components of all STEM industrial products, as illustrated in FIG. 4 and FIG. 5, can be divided into two parts: hardware and software. As depicted in FIG. 5, all STEM industrial products can also be eventually divided into five major components, input unit, control unit, arithmetical unit, memory unit, and output unit.

Note: For any additional parts or supplementary tools required for the use of STEM industrial products, they are classified as accessory.

Hardware can refer to a physical component of any computer or telecommunications system. It is a manufactured item and may refer to tools, machinery, and other durable equipment. The hardware part can be divided into functional and structural components. For functional components, they are four major categories of blocks: Sensors, Operators, Actuators, and Utilities. Sensor blocks sense signals from the environment including light, sound, touch, motion, and distance from objects, and they then pass signals to connected neighboring blocks. Operator blocks apply functions to those signals including arithmetic functions that compute a number from two or more numbers, such as sum, maximum, minimum, inverse, and threshold. Actuator blocks convert signals they receive into various types of action. Utility blocks include a power source block, including a battery, such as a lithium-ion or solar powered battery, that must be included in each construction. Structural components refer to some supporting structures such as columns, posts and beams.

Software can refer to a set of instructions, data or programs used to operate computers, device systems, and execute specific tasks. For example, assembly language, C language, C++, App Inventor, etc. Software is different from hardware, which describes the physical aspects of a computer or a device system. Software is a generic term used to refer to programs, scripts, and applications that run on a device system. It can be viewed as the variable part of a computer or a device system, while hardware is the invariable part. There are different categories of software such as application software, system software, programming software, and middleware. An application is software that fulfills a specific need or performs tasks. System software is designed to run a computer's hardware and provides a platform for applications to run on. Programming software provides the programming tools software developers need. A middleware sits between system software and applications, and a driver software operates computer devices and peripherals.

2.1.3. (Review of assessment) STEM Industrial Product Classification:

Defining generic building blocks in STEM industrial products and classifying STEM industrial products by function is given as follows.

A product consists of its physical and functional terms. The overall performance of a product depends on the convergence of individual operational functions and the physical elements of the product such as its parts, components and its assembly that enable the execution of the product function. Generally, the physical elements of a product consist of a few major physical building blocks. Each of these blocks is a compilation of components that execute certain functions and could consist of interchangeable components to produce similar functions. The buildup of the product is a result of the arrangement of the functional elements into building blocks [28].

After obtaining a clear definition of STEM industrial products and characteristics, we can start defining the key building blocks for STEM industrial products. This is achieved by using both the literature review and surveys among STEM teachers. The qualitative research method is an important supplement to the traditional quantitative research.

Many STEM industrial products that use coding have a block-based programming structure where novice coders are able to make functional programs by dragging and dropping blocks onto a workspace that reduces tedious commands and syntax requirements [29]. This simpler representational system allows for ease of use for these types of products.

Critical attributes for a good framework for STEM industrial products (e.g., toys) are developed. The generic building blocks for STEM industrial products should include essential skills that are being developed, such as critical thinking, problem-solving, creativity, communication, collaboration, data literacy, digital literacy and computer science [26].

Further, STEM industrial products can be divided into three major categories according to their functions [30]. For the first category, its function is to understand and learn theories (T). For the second category, its function is to establish a bridge (B) role for display, exchange and cooperation. As for the third category, its function is to develop solutions and realize (R) specific goals.

Some product examples in each category are listed as follows:

Category (T): programming educational products, Lego blocks, mechanical principle toys, etc.

Category (B): 3D printer, drones, virtual reality goggles, etc.

Category (R): robots that implement specific functions, such as dishwasher robots, cooking robots, grocery shopping robots, etc.

Some STEM industrial products may involve more than one category in their functions, so the functions of the STEM industrial products can be expressed as a proportion of different categories, for example, programmable soccer robots, which can be used to understand the principle of programming, but also can equally realize the function of robots playing football. So it can be divided into category (T) of 50%, and category (R) of 50%. In theory, category (T), category (B) and category (R) belong to low level, intermediate level and high level in terms of the product function. STEM industrial products with low-level category (T) can be transformed into intermediate level or high-level components after the assembly of some higher-level category components, and STEM industrial products with high-level components can also be split into several low-level components after the disassembly of some lower-level category components.

(A) Study of Training Blocks of STEM Industrial Products

Training blocks are defined as a series of quantitative structures for the users of STEM industrial products to acquire certain capacities connected with the features of STEM industrial products.

People who use the STEM industrial products can utilize training blocks to gain general abilities like critical thinking, communication skills, collaboration skills, creativity skills [31], innovation skills, information technology skills, numeracy skills, spatial thinking skills, problem-solving skills, management skills, self-study skills, team-working skills, organization of work skills, improving own learning and performance skills [32], data literacy skills, digital literacy skills, and so on.

(B) Study of Features of STEM Industrial Products

The features of STEM industrial products can be classified as tangible or intangible. Tangible features may refer to the packaging and warranties of a product. Intangible features are symbolic of a product, such as brand image. Intangible features can include things like images as well as the level of the relationship between a service provider and a customer. People make decisions about which products to buy after considering both tangible and intangible features of a product.

The features of STEM industrial products include tangible features, which are size, color, weight, volume, smell, taste, touch, quantity, material composition, observability, spatial relationships, and the like, and intangible features, which are price, quality, reliability, beauty or aesthetics, safety, functionality, economy, durability, maintainability, applicability, practicability, controllability, robustness, etc.

2.2. Integrated Product Development (IPD): Integrated Product Development of STEM Industrial Products 2.2.1. IPD Review The Integrated Product Development (IPD) approach is the paradigm for new product development due to its many advantages as compared to traditional methods [33]. IPD uses the interaction in overlapping, parallel execution, and concurrent workflow for evaluating STEM industrial products. It is used to view the coordination of systems within STEM industrial products such as interdependent conflict mitigating and interpretation-aligning elements that involve the 4 components of STEM; Science, Technology, Engineering, and Mathematics. Both the quality and IPD characteristics are evaluated in relation to STEM industrial products Additionally, factors that deteriorate IPD characteristics are identified to reduce their impact on the effectiveness of the STEM industrial products [33, 34].

IPD is a framework based on the integrated design of products and manufacturing and support processes. It suggests the consideration of all of the competitive factors or "-ilities" from the preliminary stage of product development and design into the product [35].

The word "-ilities" refers to different kinds of software quality (e.g., testability, reliability [37]), often informally called "ilities" since most of their names end in "-ility". The main goal is to help management and active project teams reach innovation goals [38].

2.2.2. Benefit of IPD

By using a formal, structured approach to implementing IPD for new product design and development, these costs can be decreased, product quality and performance can be improved, and time-to-market can be shortened. Using the concept of IPD can make the design of STEM industrial products more scientific and more cost-effective.

The essential principles of integrated product development can be summarized as follows.

Understand manufacturers, teachers and students and their requirements.

Integrate R&D, product development, and process investments with an overall business strategy.

Use Product Development Teams to facilitate early involvement and parallel design.

Design products and manufacturing and support processes in parallel.

Involve suppliers early in the development process.

- Use digital product models to capture and maintain a more complete and consistent representation of the design.
- Integrate CAE, CAD and CAM tools to improve effectiveness and reduce design cycle time.
- Simulate product performance and manufacturing processes electronically to reduce costly design/build/test iterations.
- Use quality engineering and reliability techniques to develop a more robust product and process design.
- Create an efficient and streamlined development approach to reduce cost and design cycle time.
- Improve the design process continuously.

Figure 6:
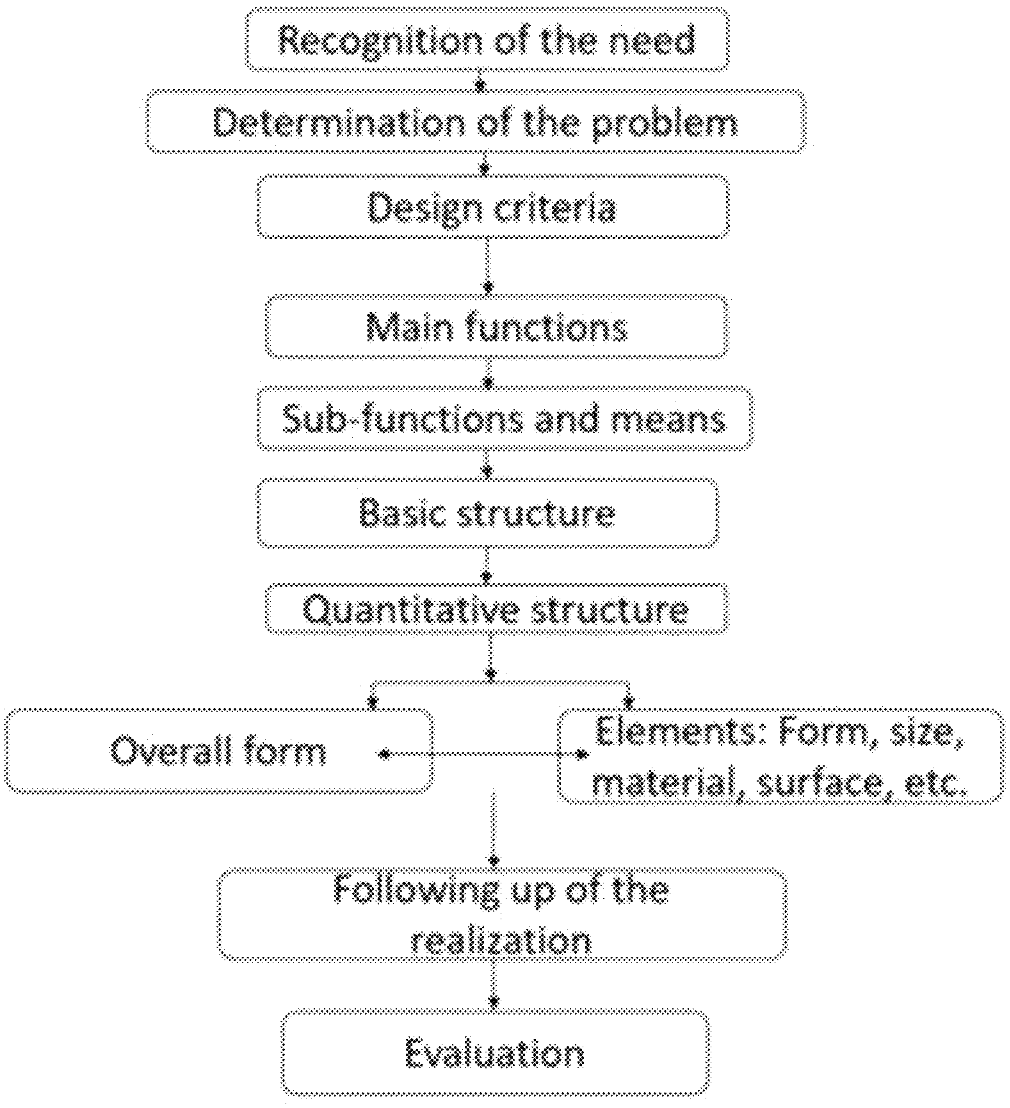
FIG. 6 depicts a flowchart showing an IPD product synthesis.
Figure 7:
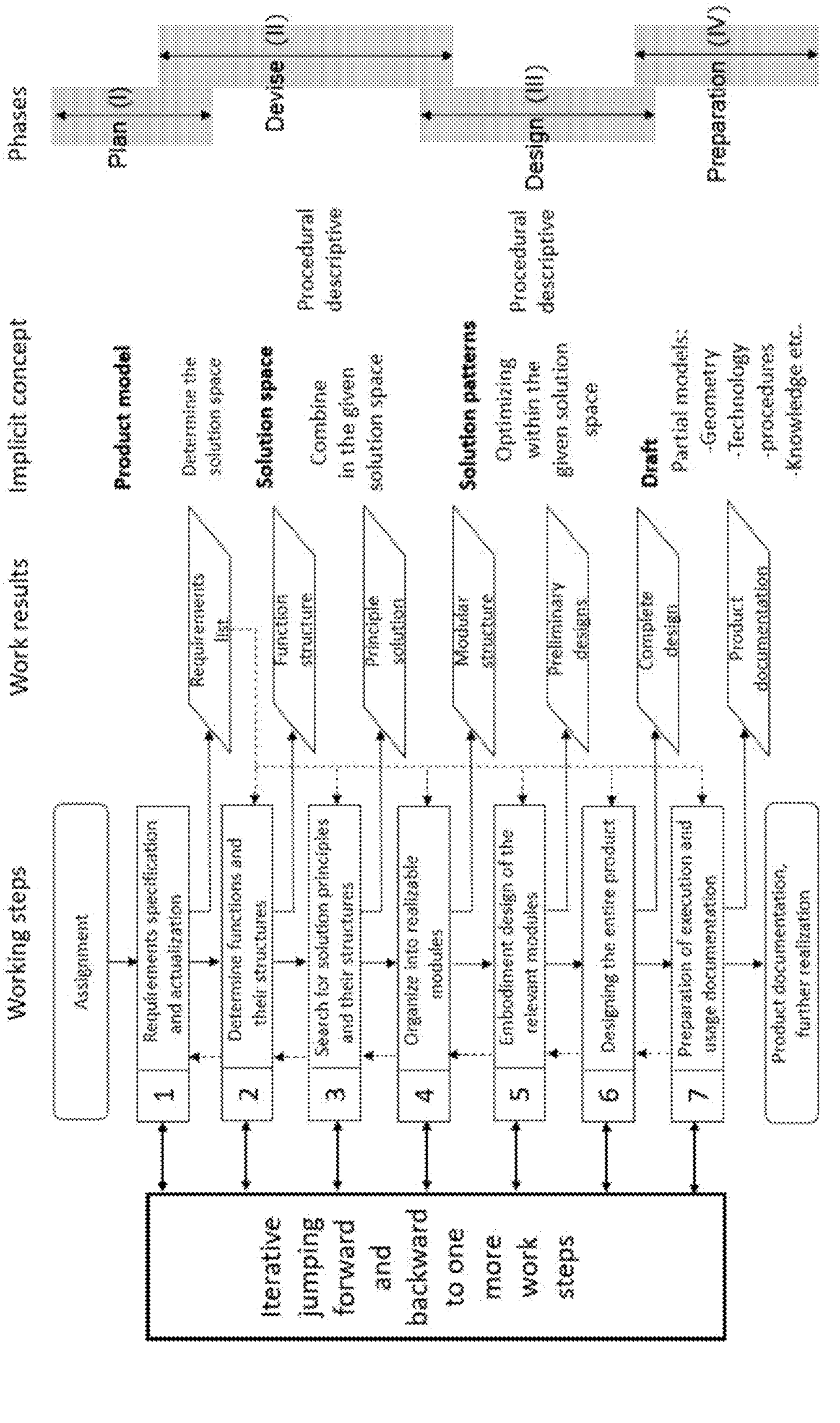
FIG. 7 depicts a general procedure for the design of STEM industrial products [39].

There is still no research directly on the integrated product development (IPD) of STEM industrial products. A procedure for IPD product synthesis is shown in FIG. 6. FIG. 7 describes the process of designing STEM industrial products from the perspective of biological evolution, which determines possible solutions and solution spaces [39]. In general, from the idea of a product to its realization, it is roughly divided into the seven steps shown in FIG. 7. The first step is the requirements specification and actualization part. In this part, it is necessary to carefully analyze the demand positioning of the product, and at the same time examine the existing product situation analysis. Taken together, a relatively accurate product positioning can be obtained. In the second step, determine the product functions and their structures. Considering the realization of each function, and logically arranging the functional structure of the product in order to achieve the optimal design.

In the third step, search for solution principles and their structures. Considering the scientific knowledge principles involved in the realization of the function, and make the product structure reasonable, safe and reliable by rationally arranging the realization steps. In the fourth step, organize into realizable modules. In this part, the feasibility of each option is analyzed. Establish as many shared module units as possible to achieve specific functions in a combined manner. The fifth step is the embodiment design of the relevant modules. In this part, it is mainly the analysis of the completed functional modules. The sixth step is designing the entire product. Integrate the entire product according to achievable functions. The seventh step is the preparation of execution and usage documentation. In this part, what we need to do is to undertake the previous function, and then specify the product manual. These seven steps can be performed repeatedly as required, or steps can be skipped to achieve good product properties in the end. The above steps can be summarized into four major areas, plan, devise, design, and preparation. Product demand affects the solution space. The knowledge used and the solution patterns limit the solution space. Finally, all the principles and rules are used in the solution space to evolve and optimize into a product.

2.3. Development of a Certification Framework and Process for STEM Industrial Products Besides the development of training blocks and features mentioned in section 2.1, the development of a certification framework for STEM industrial products also requires the consideration of the integrated product development as described in section 2.2, statistical methods for the two online surveys of STEM product manufacturers and STEM educators, the required framework and process for STEM industrial products as described in the below sections 2.3.1 and 2.3.2.

18 purchased STEM industrial products were used in the test bed of this work. Two online questionnaires for STEM product manufacturers and educators were prepared. The questionnaires were sent to the STEM product manufacturers and educators for the collection of the required information for the development of the certification framework of STEM industrial products to be done in section 2.3.2.

2.3.1. Statistical Methods for Two Online Surveys of Manufacturers and Educators In order to determine the product functions for the development of modular products, different statistical analysis methods are used. The reliability and validity, one-way ANOVA, two-way ANOVA, and Pearson correction analysis are found to be four suitable statistical analysis methods in this work for determining the significant influence of each concerned product function based on the collected responses from the two online surveys of manufacturers and educators. The SPSS and Minitab software are used in this work for the statistical analysis.

2.3.2. Certification Framework for STEM Industrial Products:

Framework and process for the certification of STEM industrial products is given as follows.

Based on literature review and the work done in this project, a certification framework for the certification of STEM industrial products is proposed as follows:

If a product passes all the required tests and fulfils the relevant requirements in accordance with the definitions of the STEM industrial products (refer to section 1, section 2.1 and FIG. 8), the following three aspects will be determined.

(1) Evaluate and score the STEM literacy level that can be acquired by using the product.

(2) Evaluate and score the product features that can be found in the product.

(3) Evaluate and score the general abilities (competency) that can be learnt after using the product.

After satisfying all the requirements in the evaluations, STEM industrial product certification will be issued and a certification report presented. The certification report will indicate the STEM product component analysis, function analysis, STEM teaching suggestions, usage, report, etc.

Figure 8:
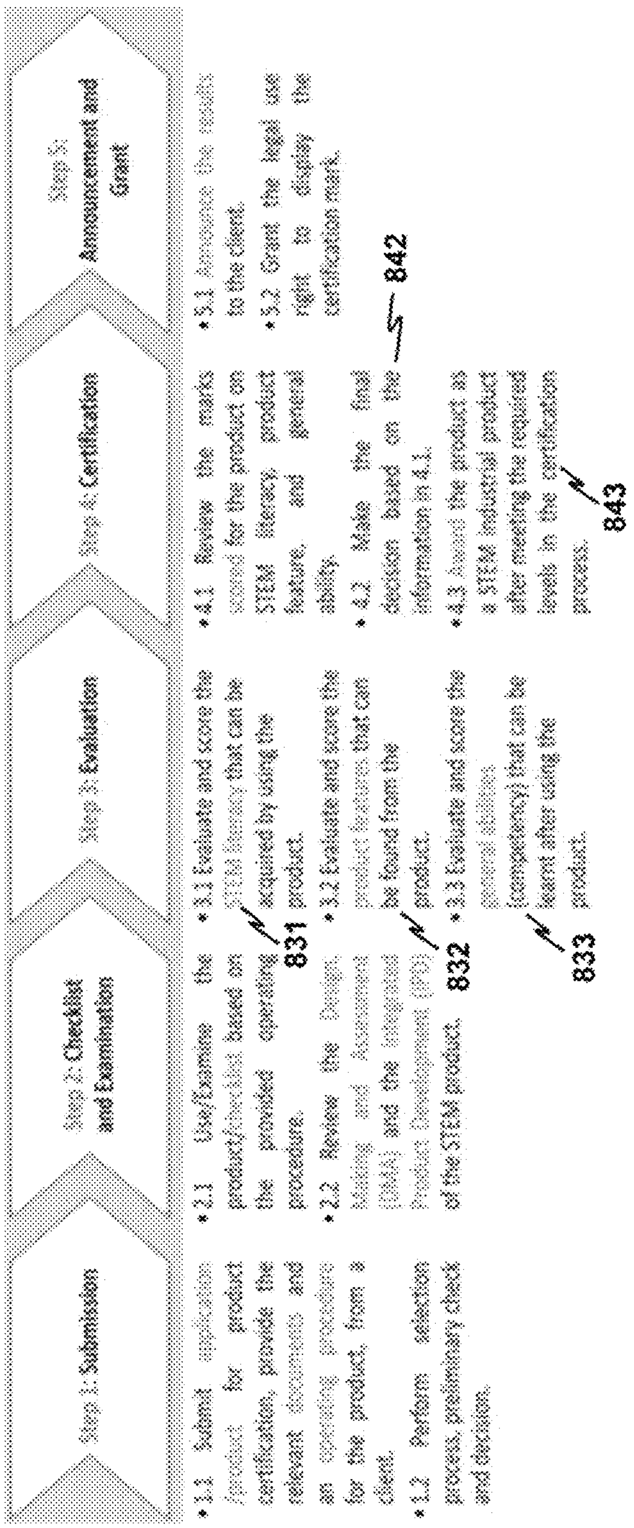
FIG. 8 depicts a diagram for illustrating the certification process.

The certification process is expected to be conducted using the outline approach below as illustrated in FIG. 8. There are 5 basic steps from getting the certification, namely submission, checklist and examination, evaluation, certification, and announcement and grant.

(A) General Certification Process (A.1) Step 1

The first step of awarding certification is "submission". In order to reduce the workload of the concerned laboratory and certification personnel, various documents need to be submitted along with the STEM industrial product. A client or a manufacturer needs to explain which STEM attribute is covered and how the product is going to provide the learning experience. This provides guidelines and direction for the certification personnel to examine and evaluate the product. The operating procedure should also be submitted for reference, so that extra time does not need to be taken in knowing how to use the product. The documents are intended to case the workload of the laboratories and make the certification framework better fit the working procedure of the certifying authorities.

(A.2) Step 2

In the second step, "checklist and examination", the review personnel will use and examine the product/checklist based on the provided operating procedure. They will then review the Design, Making and Assessment (DMA) and the Integrated Product Development (IPD) of the STEM product. The personnel will try to use the product and understand its features. Since it is too time consuming for the testing personnel to assemble the product during the certification process, for STEM product that requires assembly, the manufacturer should provide the assembled product along with the original product. This practice is designed to coordinate with the working routine of a testing laboratory. The manufacturer should also submit a description form indicating the designed education content for each STEM attribute, such that the personnel can try those particular parts only. It is another measure to prevent inducing extra workload to the laboratory.

(A.3) Step 3

The third step is "Evaluation". After trying out and understanding the product, the testing representative will evaluate the competence of delivering STEM education to the students. Evaluation and scoring on the STEM literacy, product features and general abilities will be performed. The testing personnel will compare the actual experience with the description form to assess whether the stated educational content is effective and how the product is providing the experience as stated in the form. The effectiveness of the product in providing the educational content will be the main point of assessment. The laboratory is mainly responsible for auditing the product by cross checking the product description and the actual experience. This helps minimize the time required to certify a product.

(A.4) Step 4

The fourth step is "Certification". If the product is evaluated for passing under all requirements, it will be certified as a STEM industrial product. It means the product is an effective STEM learning tool in both the coverage and level of competence. This certification framework is not intended to increase the workload of the laboratory. The cycle time to get a product certified is minimized and expected to be similar to other certification frameworks. Therefore, time-consuming processes are required to be done by the manufacturers, such as the work in the assembly of products and studying the educational value of the products.

(A.5) Step 5

The fifth step is "Announcement and Grant". The results will be announced to the client. The legal right of use will be granted to the client to display the certification mark on their product.

It should be noted that the detailed marking schemes for the three review categories, (1) STEM literacy, (2) Product features, and (3) General abilities in Step 3 have been defined by the inventors of this work. Also, the review of the three categories is related to the methods described in 2.2 (FIG. 8). As for the score for each attribute described in the review category, it is marked in accordance with the user experience by a project team from The Hong Kong Polytechnic University (PolyU).

The Step 3 and Step 4 mentioned above are two crucial steps for the certification of STEM industrial products. More elaboration on the required work in Step 3 and Step 4 is illustrated as follows:

(B) Detailed Certification Process on Step 3

(B.1) Step 3:

For Step 3, some major steps are highlighted as follows: As described in Table 1, there are 3 possible cases to be considered for STEM industrial products. For Case 1, the product has hardware only. For Case 2, the product has software only. For Case 3, the product has both hardware and software. The detailed score calculation and formulas for each case are shown in Table 1.

TABLE 1

Score calculation of product from Case 1, Case 2, and Case 3.

| Case 1: Product with hardware only | Case 2: Product with software only | Case 3: Product with both hardware and software |
|---|---|---|
| Total score for STEM literacy: $X_1$<br>Total score for product features(hardware) (available): $X_2$<br>Total score for product features(hardware) (unavailable): NA or Not to be assessed<br>Total score for software: NA<br>Total score for general abilities: $X_3$ | Total score for STEM literacy: $X_1$<br>Total score for product features(hardware) (available): NA<br>Total score for product features hardware (unavailable): NA or Not to be assessed<br>Total score for software: $X_2$<br>Total score for general abilities: $X_3$ | Total score for STEM literacy: $X_1$<br>Total score for product features (hardware) (available): $X_{2A}$<br>Total score for product features (hardware) (unavailable): NA or Not to be assessed<br>Total score for product features (software): $X_{2B}$<br>Total score for product features(hardware and software): $X_2 = (X_{2A} + X_{2B})/2$<br>Total score for general abilities: $X_3$ |
| Hardware part: The average total score: $Y = \frac{X_1 + X_2 + X_3}{3} \times 100\%$ | Hardware part: The average total score: NA | Hardware part: The average total score: $Y1 = \frac{X_1 + X_{2A} + X_3}{3} \times 100\%$ |
| Software part: The average total score: NA | Software part: The average total score: $Y = \frac{X_1 + X_2 + X_3}{3} \times 100\%$ | Software part: The average total score: $Y2 = \frac{X_1 + X_{2B} + X_3}{3} \times 100\%$ |
| Both Hardware part and Software parts: The average total score: NA | Both Hardware part and Software parts: The average total score: NA | Both Hardware part and Software parts: The average total score: $Y = \frac{X_1 + X_2 + X_3}{3} \times 100\%$ |

Remark: (1) NA represents Not Applicable; and (2) $X_1$, $X_2$, $X_3$, $X_{2A}$, and $X_{2B}$ are normalized values.

This scoring formula is used to investigate the correlation between product parts identification and the difference in total score calculation through the analysis of three distinct cases. Case 1 pertains to products that solely comprise hardware components, while Case 2 involves products that are dependent solely on software. Case 3 is characterized by products that consist of both hardware and software components. The aim of this analysis is to identify the specific factors that contribute to the scoring calculation in each of these cases. Whichever case is considered. The calculation method for the total score on STEM literacy and general abilities would remain same. However, Case 1 is assessed based on only hardware product features, whereas Case 2 is assessed solely on software product features. In contrast, Case 3 considers the average of both hardware and software product features. To determine the overall score of each case, the average marks of STEM literacy, product features, and general abilities are calculated.

(B.2) Step 3.1:

As shown in Step 3.1 (831, FIG. 8), it is a step to Evaluate and score the STEM literacy that can be acquired by using the product. For (1) Science Literacy, (2) Technology Literacy, (3) Engineering Literacy and (4) Mathematics Literacy, there are 12 potential application fields and 14 scoring criteria, 12 potential application fields and 20 scoring criteria, 12 potential application fields, and 20 scoring criteria, and 26 potential application fields and 10 scoring criteria respectively.

Figure 9:
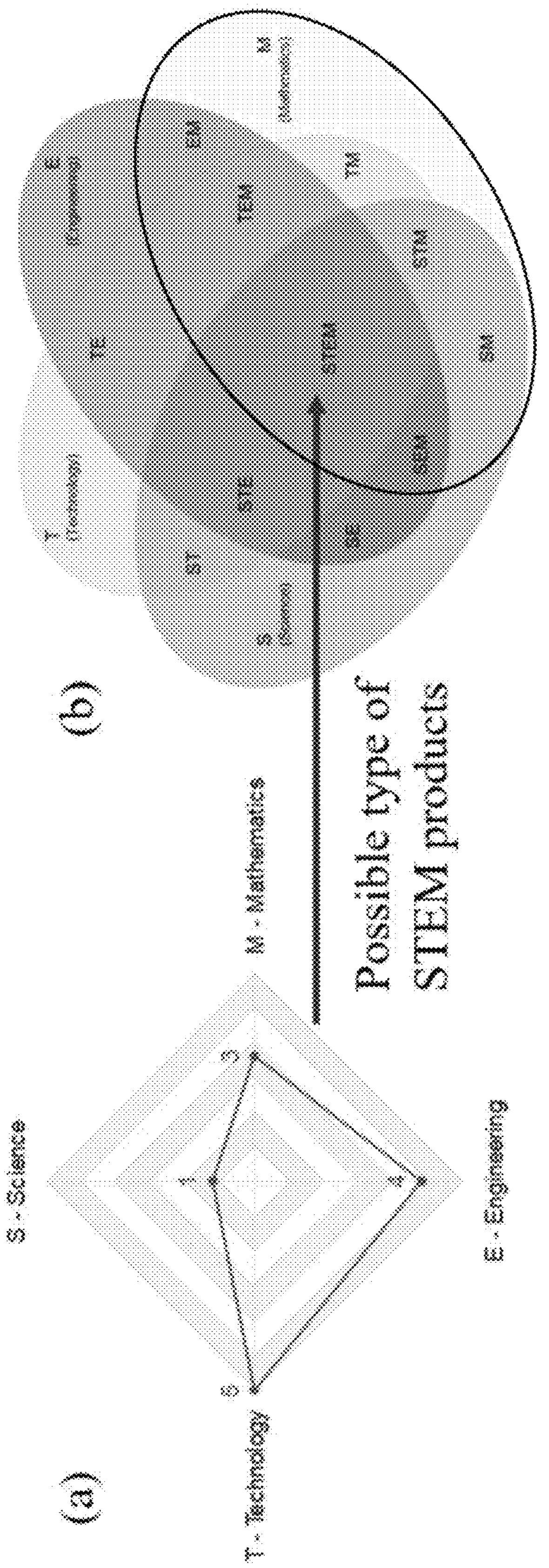
FIG. 9 depicts diagrams for evaluating and scoring of the STEM literacy: (a) an example of STEM literacy score for a STEM product; and (b) four ellipse Venn diagram for the possible type of a STEM product.

An example for a product having a score on STEM literacy is shown in FIG. 9, subplot (a). As depicted in FIG. 9, subplot (b), four ellipse Venn diagram can be used for identifying the possible type of STEM product. For the concerned product example, it has all the required components (S, T, E, M).

(B.3) Step 3.2:

As shown in Step 3.2 (832, FIG. 8), it is a step to evaluate and score the product features that can be found from the product. After the review on the Design, Making and Assessment (DMA) and the Integrated Product Development (IPD) of a STEM product, STEM literacy after using the product will be evaluated and scored.

There are 3 cases to be considered for the marking scheme of the product features.

For Case 1, it refers to a product with hardware only. For this case, the 14 review category of the product features can be specified based on the (1) Ergonomics, (2) Aesthetics, (3) Functionality, (4) Safety and reliability, (5) Product price, (6) Weight and size, (7) Materials, (8) Durability, (9) Manufacturing quality, (10) Strength and stability, (11) Environmental properties, (12) Resources/accessories, (13) Regulatory compliance, and (14) Maintenance and repair services respectively.

For Case 2, it refers to a product with software only. However, some basic hardware equipment systems must be used in accordance with the instruction manual of the product. The hardware systems are regarded as universal equipment and the total score of the systems would not be assessed. For this case, the 13 review category of the product features can be specified based on for (1) Usability, (2) Reliability, (3) Compatibility, (4) Portability, (5) Testability, (6) Scalability, (7) Flexibility, (8) Functional suitability, (9) Maintainability and repair services, (10) Interoperability, (11) Performance efficiency, (12) Product Price and (13) Security respectively.

For Case 3, it refers to a product with both hardware and software. For this case, there are two total scores for the product features on hardware and software respectively. The scoring criteria on hardware and software can be referred to the same procedure for Case 1 and Case 2 mentioned above respectively.

Figure 11:
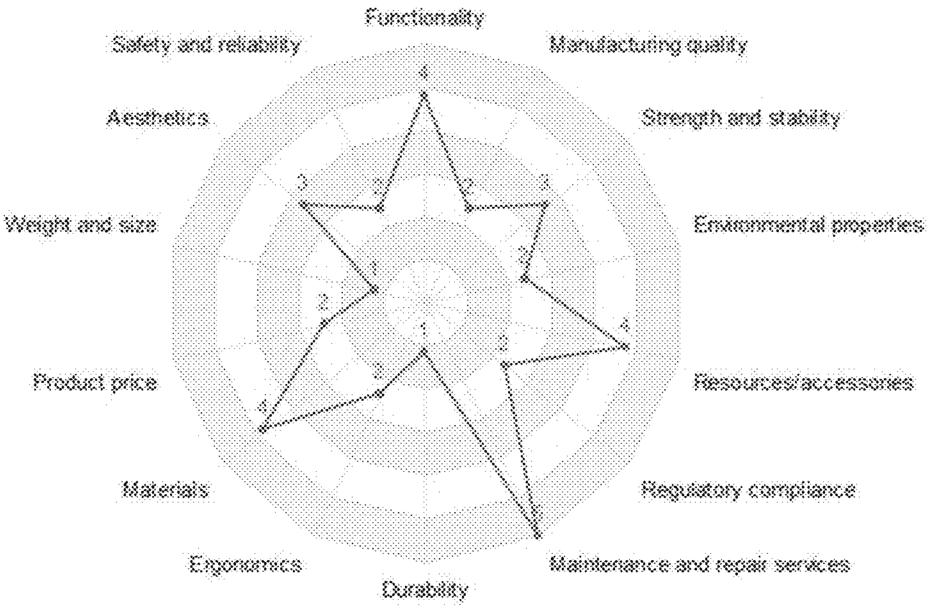
FIG. 11 provides a first example of product features score for a STEM product (Case 1: hardware only).
Figure 12:
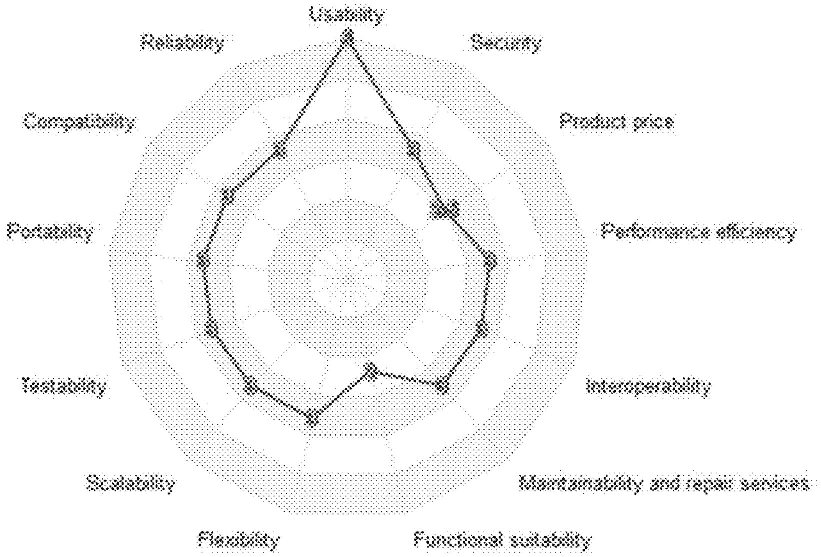
FIG. 12 provides a second example of product features score for a STEM product (Case 2: software only).

Some descriptions of product features are given in FIG. 10. An example for the product features score on a product (Case 1: hardware only) and a product (Case 2: software only) are shown in FIG. 11 and FIG. 12, respectively.

(B.3) Step 3.3

Figure 13:
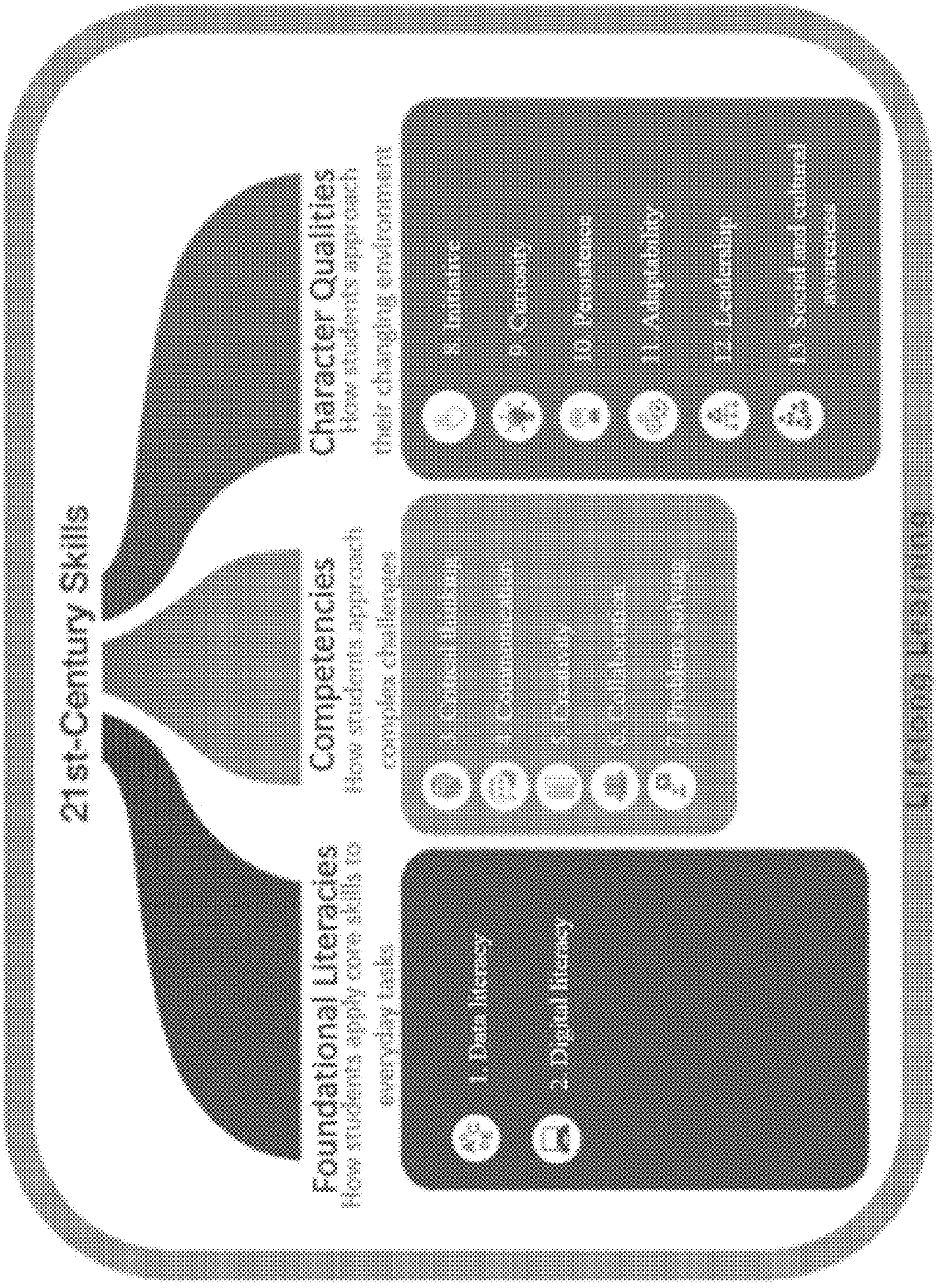
FIG. 13 depicts examples of foundational literacies, competencies, and character qualities (source: https://enterrasolutions.com/blog/stem-education-helps-teach-skills-necessary-for-21 st-century-success/).
Figure 14:
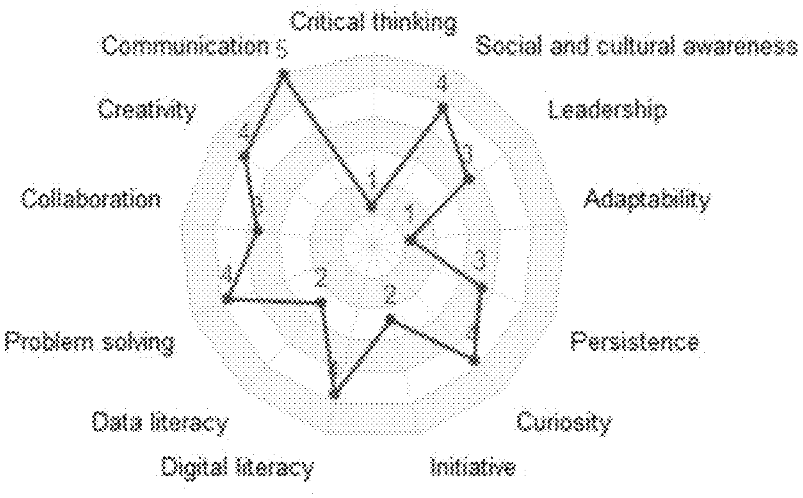
FIG. 14 provides an example of score in general abilities after using a STEM product.

As described in Step 3.3 (833, FIG. 8), it is a step to evaluate and score the general abilities that can be learnt after using the product. After the review on the Design, Making and Assessment (DMA) and the Integrated Product Development (IPD) of a STEM product, general abilities that can be learnt after using the product will be evaluated and scored based on 21st century skills as described in FIG. 13. For (1) Critical thinking, (2) Communication, (3) Creativity, (4) Collaboration, (5) Problem-solving, (6) Data literacy, (7) Digital literacy, (8) Initiative, (9) Curiosity, (10) Persistence, (11) Adaptability, (12) Leadership, and (13) Social and cultural awareness, there are 9 scoring criteria, 7 scoring criteria, 5 scoring criteria, 5 scoring criteria, 6 scoring criteria, 17 scoring criteria, 5 scoring criteria, 10 scoring criteria, 10 scoring criteria, 6 scoring criteria, 5 scoring criteria, 5 scoring criteria, and 6 scoring criteria respectively. An example of the score in general abilities after using a STEM product is shown in FIG. 14.

(C) Detailed Certification Process on Step 4

As described in Step 4 (FIG. 8), it is a step for Certification. A STEM industrial product (Case 1: Hardware only) is chosen as an example for illustration.

(C.1) Step 4.1

Figure 15:
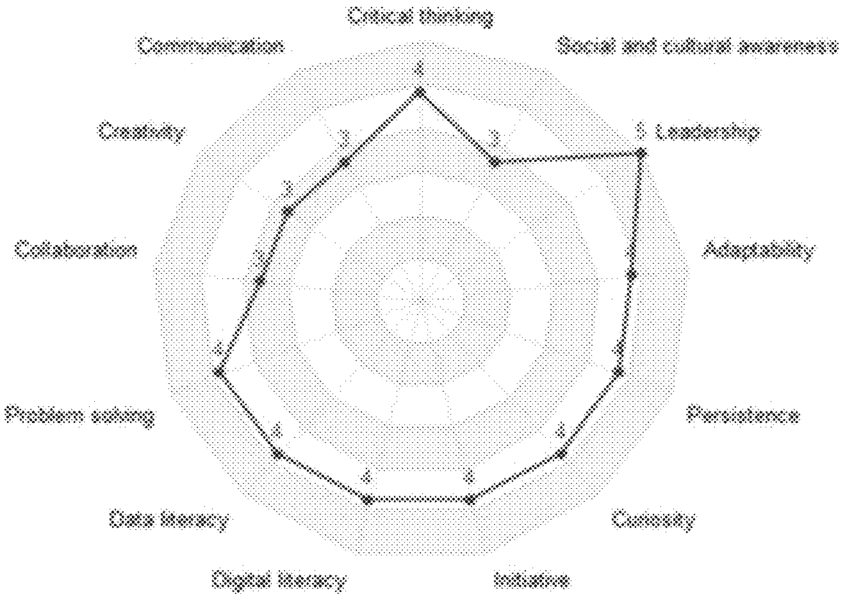
FIG. 15 shows calculated score for a product (with hardware only): (a) STEM literacy score for a STEM product; (b) product features score for a STEM product; and (c) general abilities score for a STEM product.

As described in Step 4 (FIG. 8), it is a step for the review of the score marking results (an example is shown in FIG. 15) and the report.

(C.2) Step 4.2

As described in Step 4.2 (842, FIG. 8), it is a step for making the final decision based on the information in Step 4.1.

Assume (1) STEM literacy, (2) product features, and (3) general abilities are equally important for the certification of a STEM industrial product.

The weighting factors for STEM literacy, product features, and general abilities are all set as 1.

Normalization:

$$X(j)_{norm} = \frac{X_i - X_{min}}{X_{max} - X_{min}} \tag{1}$$

Total Score:

$$Y = \frac{\sum_{j=1}^{3} X(j)_{norm}}{3} \times 100\% \tag{2}$$

The simplified formula above, namely, EQN. (2), is used to calculate the total score for a STEM industrial product where: $X_i$ is a score for STEM literacy, product features and general abilities, i=1,2,3, respectively; $X(j)_{norm}$ is a normalized score for (1) STEM literacy, (2) product features and (3) general abilities, j=1,2,3, respectively; $X_{max}$ is the corresponding maximum value; $X_{min}$ is the corresponding minimum value; and Y is the total score of the STEM product in percentage.

(C.3) Step 4.2 Make the Final Decision Based on the Information in Step 4.1

For the example product's operation process, the following formulas are obtained:

$$X(1)_{norm} = \frac{X_1 - X_{min}}{X_{max} - X_{min}}; \tag{3}$$

-continued $$X(2)_{norm} = \frac{X_2 - X_{min}}{X_{max} - X_{min}}; \quad (4)$$

$$X(3)_{norm} = \frac{X_3 - X_{min}}{X_{max} - X_{min}}; \quad (5)$$

and $$Y = \frac{X(1)_{norm} + X(2)_{norm} + X(3)_{norm}}{3} \times 100\%. \quad (6)$$

The detailed formulas above are used to calculate the total score in percentage for the product:

Total score: $Y =$ $$\frac{\left(\frac{17-0}{20-0} + \frac{56-0}{70-0} + \frac{49-0}{65-0}\right)}{3} \times 100\% = \frac{(0.85 + 0.80 + 0.75)}{3} \times 100\% = 80\%.$$

(C.4) Step 4.3

As described in Step 4.3 (843, FIG. 8), it is a step for awarding the product as a STEM industrial product with the corresponding certification level (as described in Table 2).

Based on the total score, Y, calculated in Table 1, the total score in percentage is given by the formula (i.e. (Total score÷5)×100%). By comparing the total score in percentage to the certification level from Table 2, the relative certification level of the product can be determined. Regarding product evaluation, any product with a score below 40% will be certified as having a poor level of quality. A product that scores below 50% will be considered basic, while a score below 60% will indicate an average level of quality. A product that scores between 60% to 77% will be certified as good, and any product that scores above this threshold will be deemed excellent.

(D) Certification Level of a STEM Industrial Product

Total score in percentage, certification level, and certification status for the STEM industrial product (Case 1: hardware only) are described as follows:

Y=80%

Certification level is found to be 5 (Excellent).

Star rating is described as ★★★★★.

TABLE 2

The conversion table of the total score (in percentage), certification level, star rating, and description for the STEM industrial product.

| Total score (in percentage, %) | Certification level | Star rating | Description |
|---|---|---|---|
| 77% ≤ Y ≤ 100% | 5 (Excellent) | ★★★★★ | Satisfies all quality criteria and achieves quality at an excellent level. |
| 60% ≤ Y < 77% | 4 (Good) | ★★★★ | Satisfies and achieves quality at a good level. |
| 50% ≤ Y < 60% | 3 (Average) | ★★★ | Satisfies and achieves quality at an average level. |
| 40% < Y < 50% | 2 (Basic) | ★★ | Satisfies and achieves quality at a basic level. |
| 0% ≤ Y < 40% | 1 (Poor) | ★ | Attains the quality with poor and unsatisfactory level. |

Another example for total score and certification level of a product from Case 3: Product with both hardware and software is described as follows.

Total Score and Certification Level of the Product:

The product is evaluated based on three review categories: STEM literacy, product features (hardware+software), and general abilities. After analyzing each category, it was found that this product is rated excellent in STEM literacy, product features performance, and general abilities effectiveness. As indicated in Table 3, this product is classified as excellent in terms of certification level based on a total score in percentage of around 84%.

TABLE 3

Detailed score evaluation.

| Category (Case 3: Product with both hardware and software) | Score | Full score |
|---|---|---|
| (1) STEM literacy | 4.425 | 5 |
| (2) Product features (hardware) | 3.865 | 5 |
| (3) Product features (software) | 4.356 | 5 |
| (4) Product features (hardware + software) | 4.110 | 5 |
| (5) General abilities | 4.137 | 5 |
| (6) Average of (1), (4), and (5) | 4.224 | 5 |
| (7) Total score of (6) (in percentage, %) | 84.483 | 100 |
| Certification level (Possible level: Poor/basic/average/good/excellent) | Excellent | |
| Star rating | ★★★★★ | |

REFERENCES

There follows a list of references that are occasionally cited in the specification. Each of the disclosures of these references is incorporated by reference herein in its entirety.

[1] White, and David, "What is STEM education and why is it important," *Florida Association of Teacher Educators Journal*, vol. 1, no. 14, pp. 1-9, 2014.

[2] E. J. Hom. "What is STEM Education?" Live Science Contributor [Online]," Jun. 27, 2021; http://www.livescience.com/43296-what-is-stem-education.html.

[3] Y. Li, A. Schoenfeld, A. diSessa, A. Graesser, L. Benson, L. English, and R. Duschl, "On Thinking and STEM Education," *Journal for STEM Education Research*, vol. 2, no. 1, pp. 1-13, 2019.

[4] Manosuttirit, and Artnarong, "How to Apply Technology in STEM Education Lesson By Project Based Learning." p. 012044.

[5] Lazarides, Rebecca, Lauermann, and Fani, "Gendered paths into STEM-related and language-related careers: Girls' and boys' motivational beliefs and career plans in math and language arts," *Front Psychol*, vol. 10, pp. 1243-1243, 2019.

[6] Holmes, Kathryn, Gore, Jennifer, Smith, Max, Lloyd, Adam, International Journal of Science, and Mathematics Education, "An integrated analysis of school students' aspirations for STEM careers: Which student and school factors are most predictive?," vol. 16, no. 4, pp. 655-675, 2018.

[7] National Science Board, *A national action plan for addressing the critical needs of the US science, technology, engineering, and mathematics education system*: National Science Foundation, 2007.

[8] Noonan, Ryan, and US Department of Commerce, "STEM Jobs: 2017 Update. ESA Issue Brief #02-17," 2017.

[9] European Central Bank, "Trends in potential output," pp. 13, 2011.

[10] Barcelona, Kimberly, and American Journal of Educational Research, "21st century curriculum change initiative: A focus on STEM education as an integrated approach to teaching and learning," vol. 2, no. 10, pp. 862-875, 2014.

[11] Britannica, and T. Editors of Encyclopaedia, "Producer goods," *Encyclopedia Britannica,* 2021.

[12] K. AMADEO, "What Are Capital Goods?," https://www.thebalance.com/capital-goods-examples-effect-on-economy-3306224, [Jul. 17, 2021, 2021].

[13] S. ROSS, "Capital vs. Consumer Goods: What's the Difference?," https://www.investopedia.com/ask/answers/032515/what-difference-between-capital-good-and-consumer-good.asp, [Jul. 17, 2021, 2019].

[14] Kurian, and G. Thomas, *The AMA dictionary of business and management*, [Enhanced Credo edition]. ed., New York: New York: American Management Association, 2013.

[15] N. Hashimzade, G. Myles, and J. Black, *A Dictionary of Economics*, Oxford: Oxford: Oxford University Press, Incorporated, 2017.

[16] Kolb, and R. W., *The SAGE Encyclopedia of Business Ethics and Society*, Thousand Oaks: Thousand Oaks: SAGE Publications, 2018.

[17] P. BOYCE, "Consumer Goods Definition (6 Examples and 4 Types)," https://boycewire.com/consumer-goods-definition-types-and-examples/, [Jul. 17, 2021, 2021].

[18] N. Tsupros, R. Kohler, and J. Hallinen, "STEM education: A project to identify the missing components," *Intermediate Unit*, vol. 1, pp. 11-17, 2009.

[19] K. Farla, "Joint-STEM-lab-facility," https://www.technopolis-group.com/wp-content/uploads/2020/02/Joint-STEM-lab-facility.pdf, 2019.

[20] Anderson, Judy, and Y. Li, *Integrated Approaches to STEM Education: An International Perspective*, Cham: Cham: Springer International Publishing AG, 2021.

[21] Y. Li, A. H. Schoenfeld, A. C. Graesser, L. C. Benson, L. D. English, and R. A. Duschl, "On thinking and STEM education," Springer, 2019.

[22] N. A. A. Zaki, N. Z. M. Zain, N. A. Z. M. Noor, and H. Hashim, "Developing a Conceptual Model of Learning Analytics in Serious Games for STEM Education," *Journal Pendidikan IPA Indonesia*, vol. 9, no. 3, pp. 330-339, 2020.

[23] K. C. Margot, and T. Kettler, "Teachers' perception of STEM integration and education: a systematic literature review," *International Journal of STEM education*, vol. 6, no. 1, pp. 1-16, 2019.

[24] M. G. Bertrand, and I. K. Namukasa, "STEAM education: student learning and transferable skills," *Journal of Research in Innovative Teaching & Learning*, vol. 13, no. 1, pp. 43-56, 2020.

[25] G. Strimel, and M. E. Grubbs, "Positioning technology and engineering education as a key force in STEM education," *Journal of Technology Education*, vol. 27, no. 2, pp. 21-36, 2016.

[26] S. J. Lynch, T. Behrend, E. P. Burton, and B. Means, "Inclusive STEM-focused high schools: STEM education policy and opportunity structures."

[27] A. Y. U. Reche, O. C. Junior, C. C. A. Estorilio, and M. Rudek, "Integrated product development process and green supply chain management: Contributions, limitations and applications," *Journal of Cleaner Production*, vol. 249, pp. 119429, 2020.

[28] C.-C. Huang, "Overview of modular product development," *Proceedings-National Science Council Republic of China Part a Physical Science and Engineering*, vol. 24, no. 3, pp. 149-165, 2000.

[29] J. Clarke-Midura, V. R. Lee, J. F. Shumway, and M. M. Hamilton, "The building blocks of coding: a comparison of early childhood coding toys," *Information and Learning Sciences,* 2019.

[30] [30] Z. Zhao, *STEM Education Research in U.S. Elementary and Secondary Schools*, pp. 140-147, Shanghai: Shanghai Science and Technology Education Press, 2017.

[31] M. D. Kembara, R. W. A. Rozak, and V. A. Hadian, "based Lectures to Improve Students' 4C (Communication, Collaboration, Critical Thinking, and Creativity) Skills." pp. 22-26.

[32] J. Pumphrey, and J. Slater, *An assessment of generic skills needs*: DIES, 2002.

[33] A. F. Sommer, I. Dukovska-Popovska, and K. Steger-Jensen, "Barriers towards integrated product development-Challenges from a holistic project management perspective," *International Journal of Project Management*, vol. 32, no. 6, pp. 970-982, 2014.

[34] D. Gerwin, and N. J. Barrowman, "An evaluation of research on integrated product development," *Management Science*, vol. 48, no. 7, pp. 938-953, 2002.

[35] Npdsolutions. "Implementing Integrated Product Development Practices: Lessons Learned," Mar. 23, 2022; https://www.npd-solutions.com/implementing.html.

[36] Thomasalspaugh. "Kinds of Software Quality (Ilities)," https://www.thomasalspaugh.org/pub/fnd/ility.html.

[37] J. B. Goodenough, *Evaluating Software's Impact on System and System of Systems Reliability*, CARNEGIE-MELLON UNIV PITTSBURGH PA SOFTWARE ENGINEERING INST, 2010.

[38] LLC. "Principles of Integrated Product Development," https://simple-pdh.com/principles-of-integrated-product-development/.

[39] S. Vajna, *Integrated Design Engineering: Interdisciplinary and Holistic Product Development*: Springer Nature, 2020.

What is claimed is:

1. A method for certifying a Science, Technology, Engineering and Mathematics (STEM) industrial product submitted by a client, the method comprising:

evaluating and scoring (831) a STEM literacy level acquirable by using the product to thereby yield a first score for STEM literacy;

evaluating and scoring (832) product features findable in the product to thereby yield a second score for product features;

evaluating and scoring (833) general abilities learnable after using the product to thereby yield a third score for general abilities;

making (842) a final decision on a total score for the product according to the first, second and third scores; and awarding (843) the product with a certification level according to the total score of the product, and granting to the client a legal right to display a certification mark that indicates the certification level on the product;

wherein the making of the final decision on the total score includes:

normalizing the first, second and third scores to yield normalized scores of STEM literacy, of product features and of general abilities, respectively; and computing the total score by averaging the normalized scores of STEM literacy, of product features and of general abilities.

2. The method of claim 1, wherein the product is hardware only, and wherein the evaluating and scoring of the product features includes:

respectively evaluating the product under review categories of: ergonomics; aesthetics; functionality; safety and reliability; product price; weight and size; materials; durability; manufacturing quality; strength and stability; environmental properties; resources or accessories; regulatory compliance; and maintenance and repair services; whereby the second score is obtained.

3. The method of claim 1, wherein the product is software only, and wherein the evaluating and scoring of the product features includes:

respectively evaluating the product under review categories of: usability; reliability; compatibility; portability; testability; scalability; flexibility; functional suitability; maintainability and repair services; interoperability; performance efficiency; product price; and security; whereby the second score is obtained.

4. The method of claim 1, wherein the product has a hardware component and a software component, and wherein the evaluating and scoring of the product features includes:

respectively evaluating the hardware component under review categories of: ergonomics; aesthetics; functionality; safety and reliability; product price; weight and size; materials; durability; manufacturing quality; strength and stability; environmental properties; resources or accessories; regulatory compliance; and maintenance and repair services; whereby a fourth score for product features related to the hardware component is obtained;

respectively evaluating the software component under review categories of: usability; reliability; compatibility; portability; testability; scalability; flexibility; functional suitability; maintainability and repair services; interoperability; performance efficiency; product price; and security; whereby a fifth score for product features related to the software component is obtained; and obtaining the second score by averaging the fourth and fifth scores.

5. The method of claim 1, wherein the general abilities include: critical thinking; communication; creativity; collaboration; problem-solving; data literacy; digital literacy; initiative; curiosity; persistence; adaptability; leadership; and social and cultural awareness.

6. The method of claim 1, wherein the normalized scores of STEM literacy, of product features and of general abilities are computed by $$X(i)_{norm} = \frac{X_i - X_{min}}{X_{max} - X_{min}},$$
$$i = 1, 2, 3,$$

and the total score is computed by $$Y = \frac{\sum_{i=1}^{3} X(i)_{norm}}{3} \times 100\%,$$

where:

$X_1$ is the first score;

$X_2$ is the second score;

$X_3$ is the third score;

$X(1)_{norm}$ is the normalized score of STEM literacy;

$X(2)_{norm}$ is the normalized score of product features;

$X(3)_{norm}$ is the normalized score of general abilities;

$X_{max}$ is a corresponding maximum value;

$X_{min}$ is a corresponding minimum value; and

Y is the total score in percentage.

7. The method of claim 6, wherein the awarding of the product with the certification level according to the total score of the product includes:

determining that the certification level is 5 when $77\% \le Y \le 100\%$ for describing that the product achieves an excellent level in quality;

determining that the certification level is 4 when $60\% \le Y < 77\%$ for describing that the product achieves a good level in quality;

determining that the certification level is 3 when $50\% \le Y < 60\%$ for describing that the product achieves an average level in quality;

determining that the certification level is 2 when $40\% \le Y < 50\%$ for describing that the product achieves a basic level in quality; and determining that the certification level is 1 when $0\% \le Y < 40\%$ for describing that the product achieves a poor, unsatisfactory level in quality.

8. A method for certifying a Science, Technology, Engineering and Mathematics (STEM) industrial product submitted by a client, the method comprising:

evaluating and scoring (831) a STEM literacy level acquirable by using the product to thereby yield a first score for STEM literacy;

evaluating and scoring (832) product features findable in the product to thereby yield a second score for product features;

evaluating and scoring (833) general abilities learnable after using the product to thereby yield a third score for general abilities;

making (842) a final decision on a total score for the product according to the first, second and third scores; and awarding (843) the product with a certification level according to the total score of the product, and granting to the client a legal right to display a certification mark that indicates the certification level on the product;

wherein the product has a hardware component and a software component, and wherein the evaluating and scoring of the product features includes:

respectively evaluating the hardware component under review categories of:

ergonomics; aesthetics; functionality; safety and reliability; product price;

weight and size; materials; durability; manufacturing quality; strength and stability; environmental properties; resources or accessories; regulatory compliance; and maintenance and repair services; whereby a fourth score for product features related to the hardware component is obtained;

respectively evaluating the software component under review categories of: usability; reliability; compatibility; portability; testability; scalability; flexibility; functional suitability; maintainability and repair services; interoperability; performance efficiency; product price; and security; whereby a fifth score for product features related to the software component is obtained; and obtaining the second score by averaging the fourth and fifth scores.

9. The method of claim 8, wherein the general abilities include: critical thinking; communication; creativity; collaboration; problem-solving; data literacy; digital literacy; initiative; curiosity; persistence; adaptability; leadership; and social and cultural awareness.

10. The method of claim 8, wherein the total score for the product is computed as a weighted average of the first, second and third scores.

11. The method of claim 10, wherein respective weighting factors of the first, second and third scores are unity in computing the total score.

* * * * *